April 3, 1934.  M. SCHNAIER  1,953,506
ART OF FEEDING AND POSITIONING ARTICLES
Original Filed Feb. 17, 1931  9 Sheets-Sheet 1
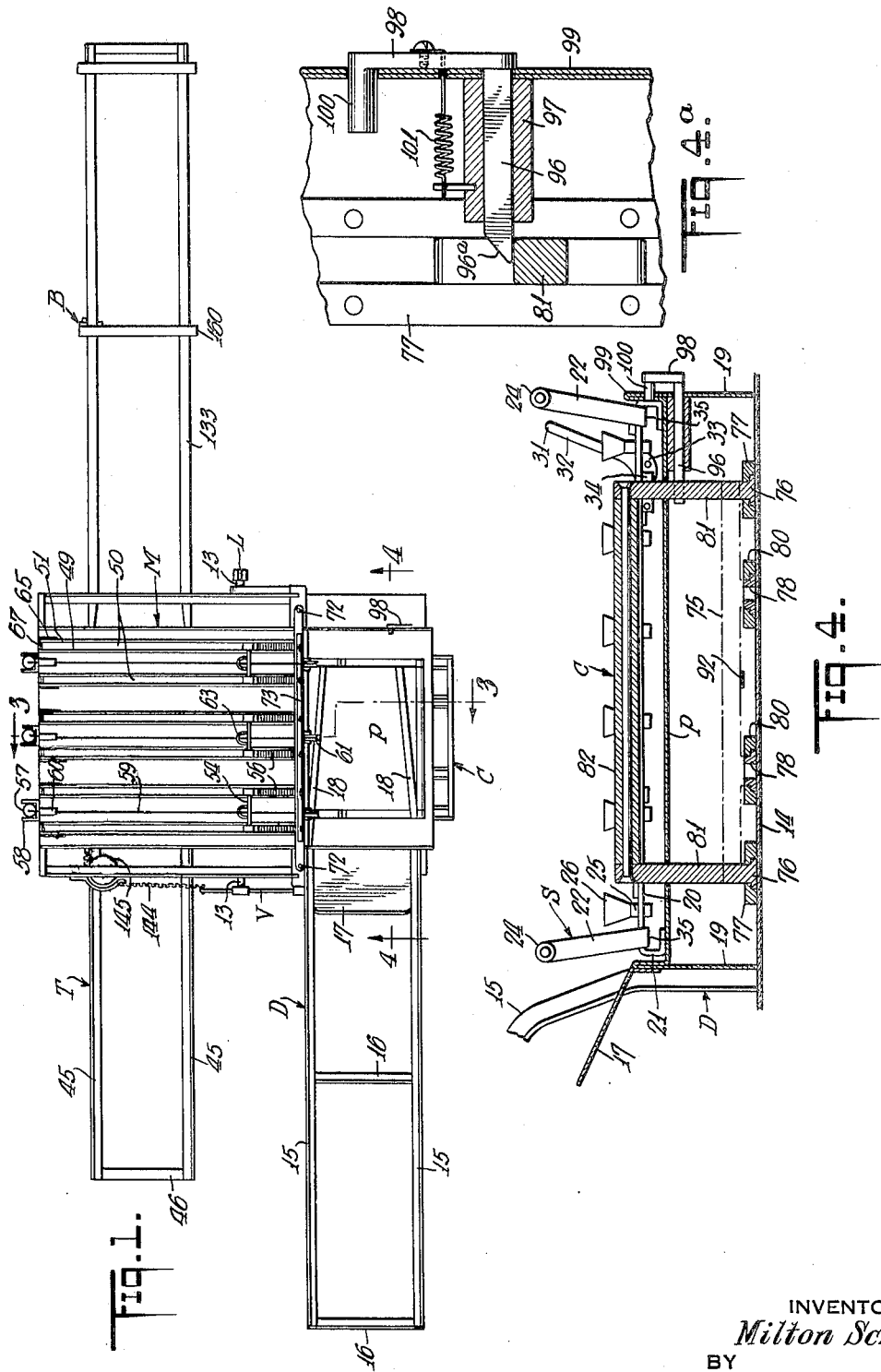
INVENTOR
*Milton Schnaier*
BY
*Dean, Fairbank, Hirsch & Foster*
ATTORNEYS April 3, 1934.  M. SCHNAIER  1,953,506
ART OF FEEDING AND POSITIONING ARTICLES
Original Filed Feb. 17, 1931  9 Sheets-Sheet 2
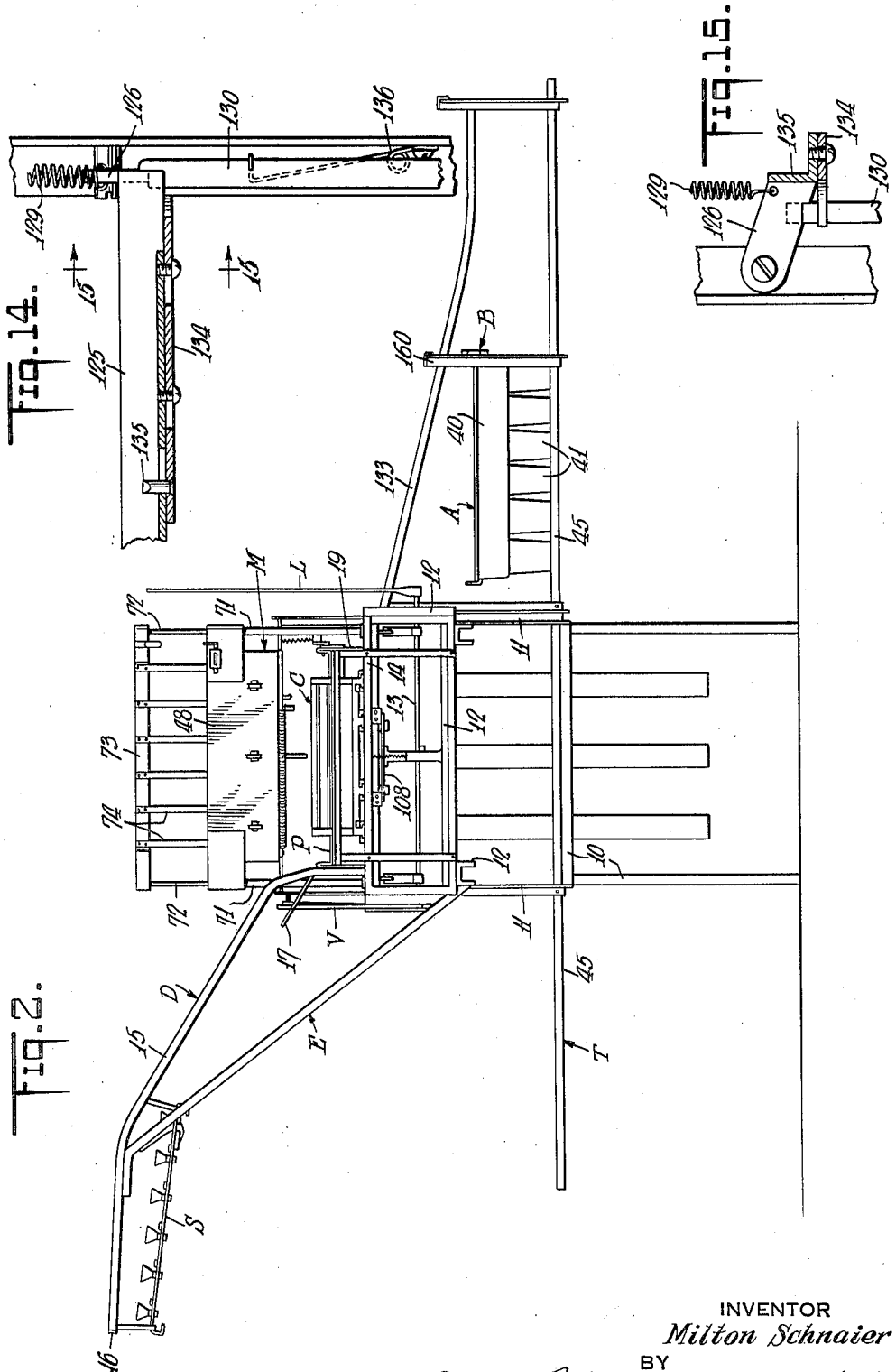
INVENTOR
*Milton Schnaier*
BY
Dean, Fairbank, Hirsch & Foster
ATTORNEYS

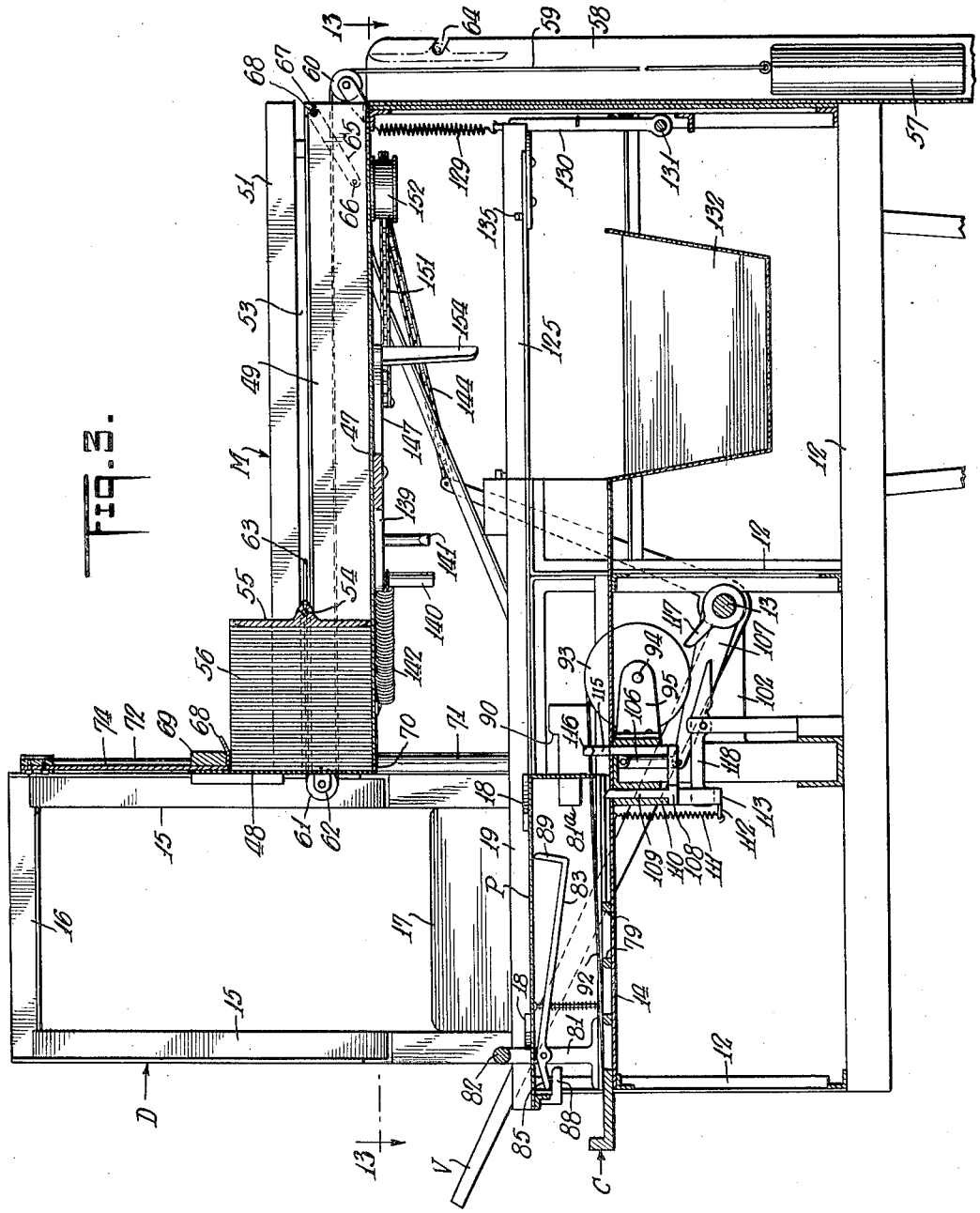

April 3, 1934. M. SCHNAIER 1,953,506
ART OF FEEDING AND POSITIONING ARTICLES
Original Filed Feb. 17, 1931 9 Sheets-Sheet 4

INVENTOR
*Milton Schnaier*
BY
*Dean, Fairbank, Hirsch & Foster*
ATTORNEYS

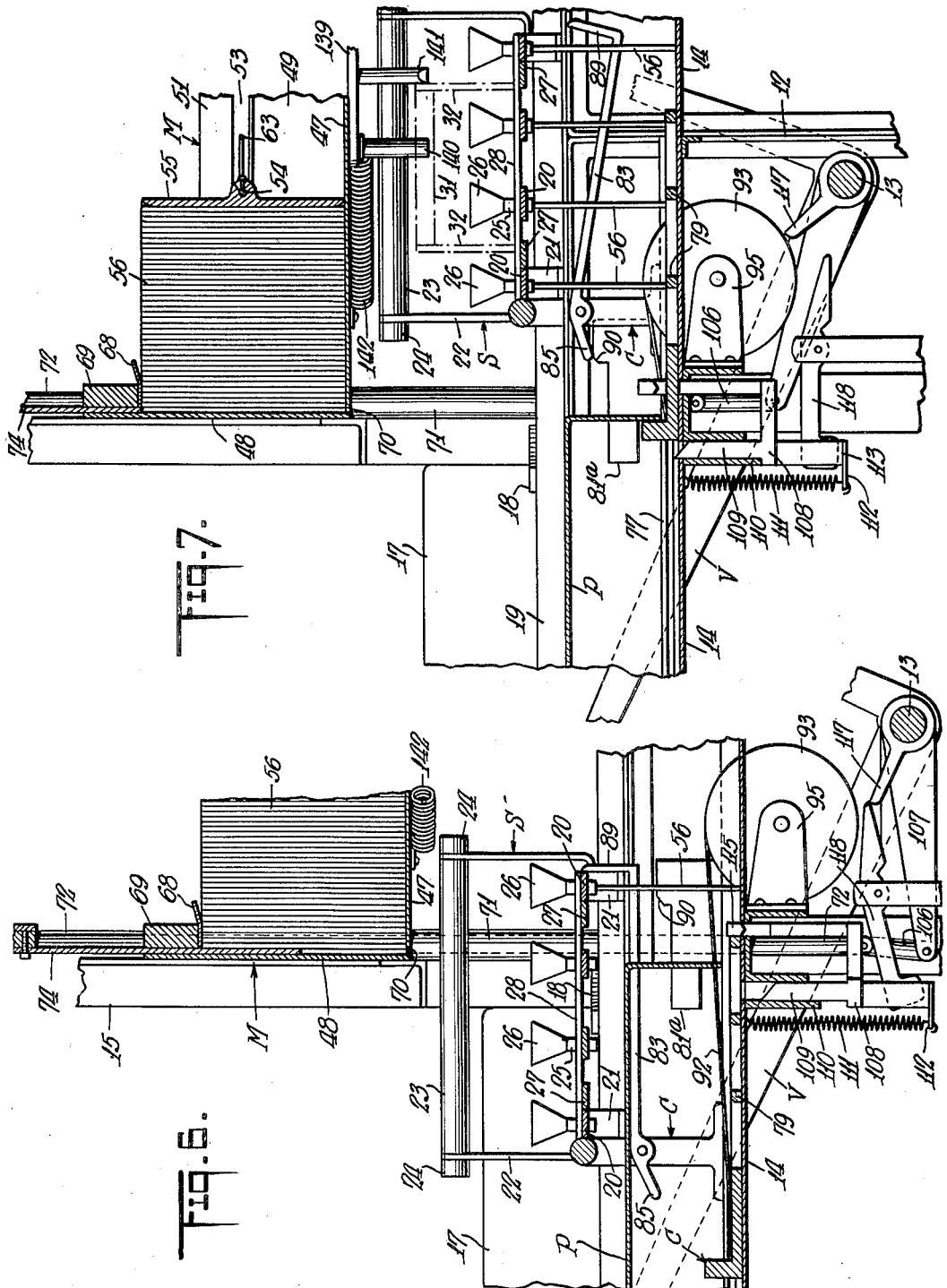

April 3, 1934. M. SCHNAIER 1,953,506
ART OF FEEDING AND POSITIONING ARTICLES
Original Filed Feb. 17, 1931 9 Sheets-Sheet 6
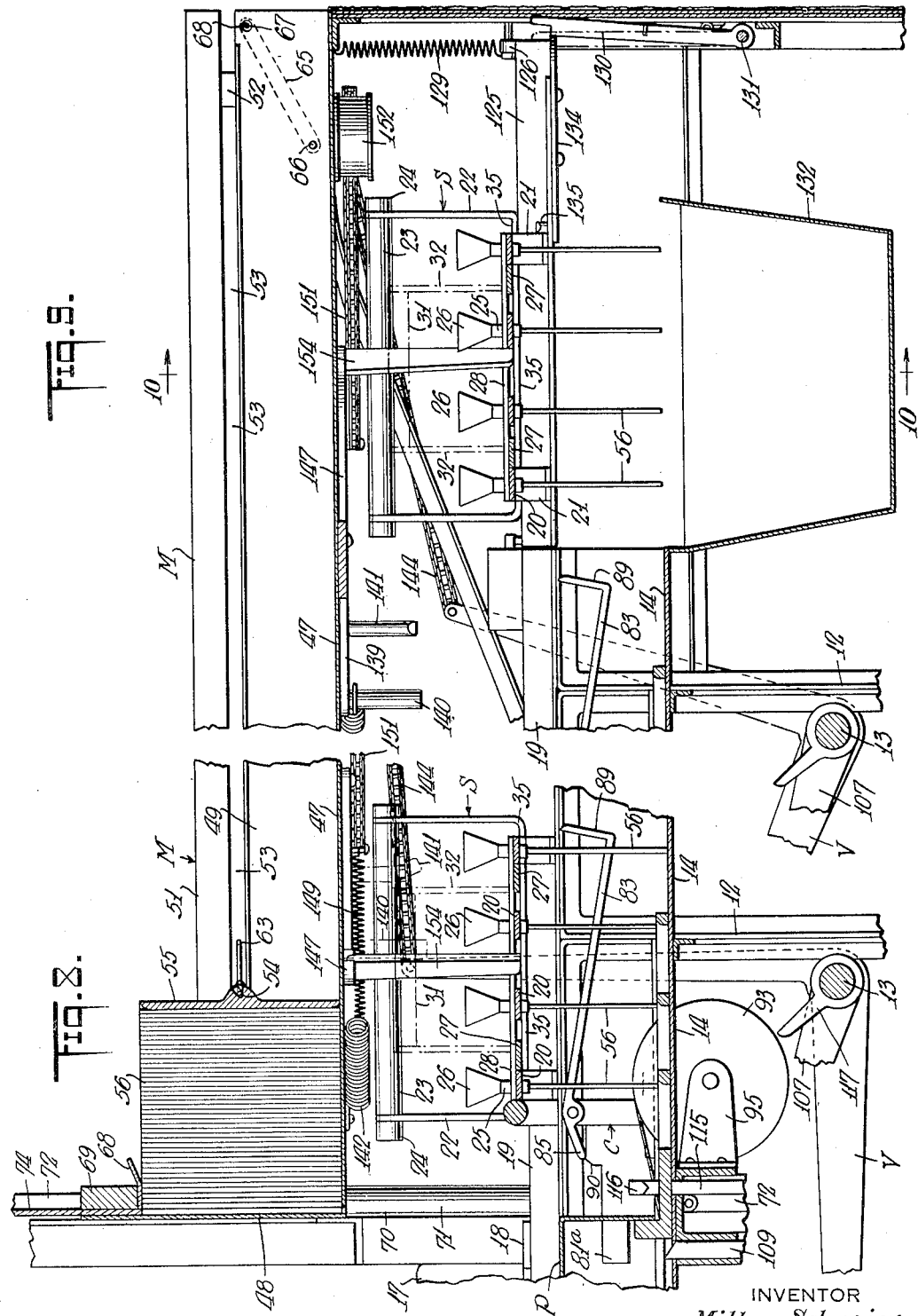
INVENTOR
Milton Schnaier
BY
ATTORNEYS

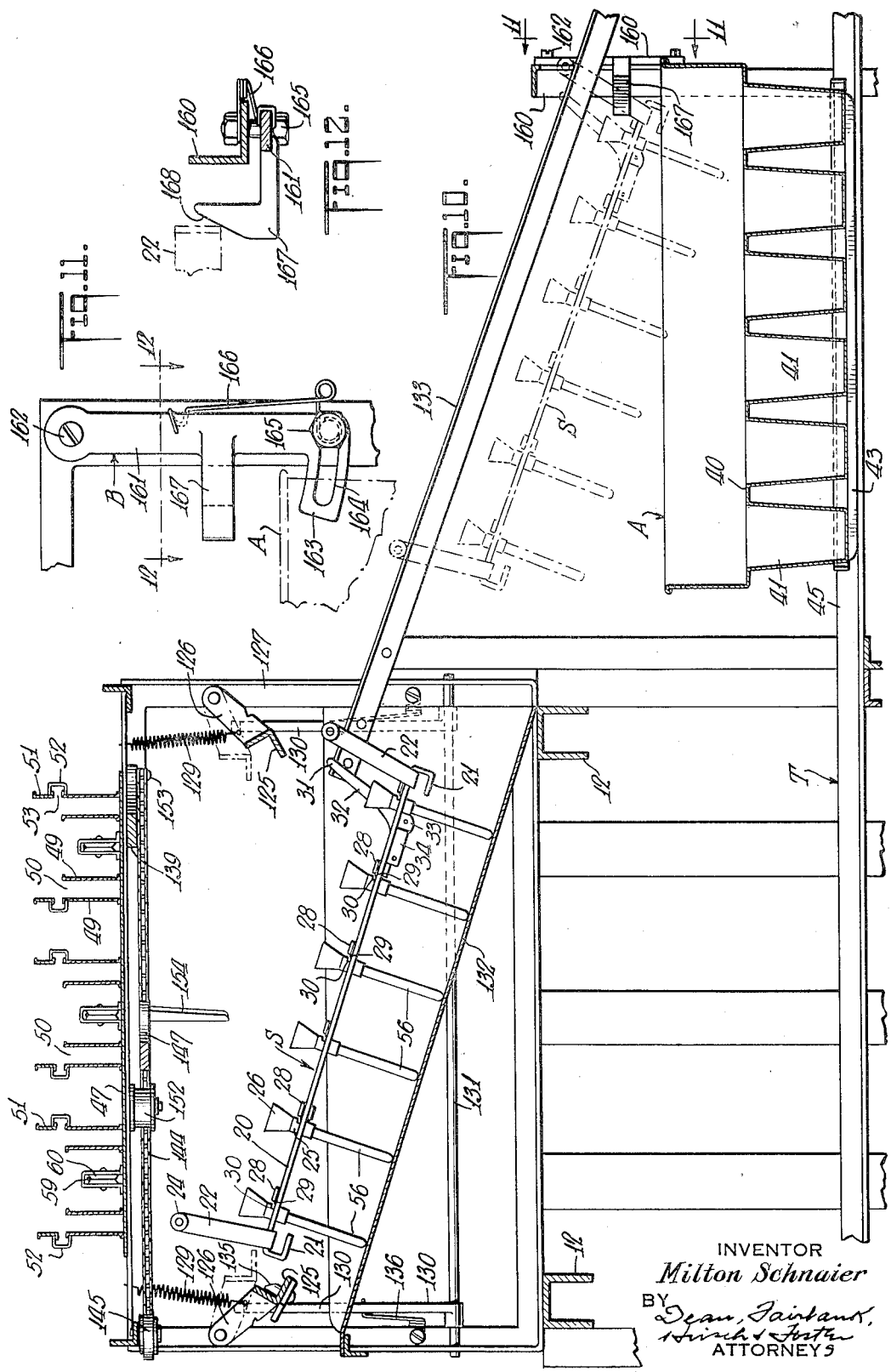

April 3, 1934.　　　　M. SCHNAIER　　　　1,953,506
ART OF FEEDING AND POSITIONING ARTICLES
Original Filed Feb. 17, 1931　　9 Sheets-Sheet 8
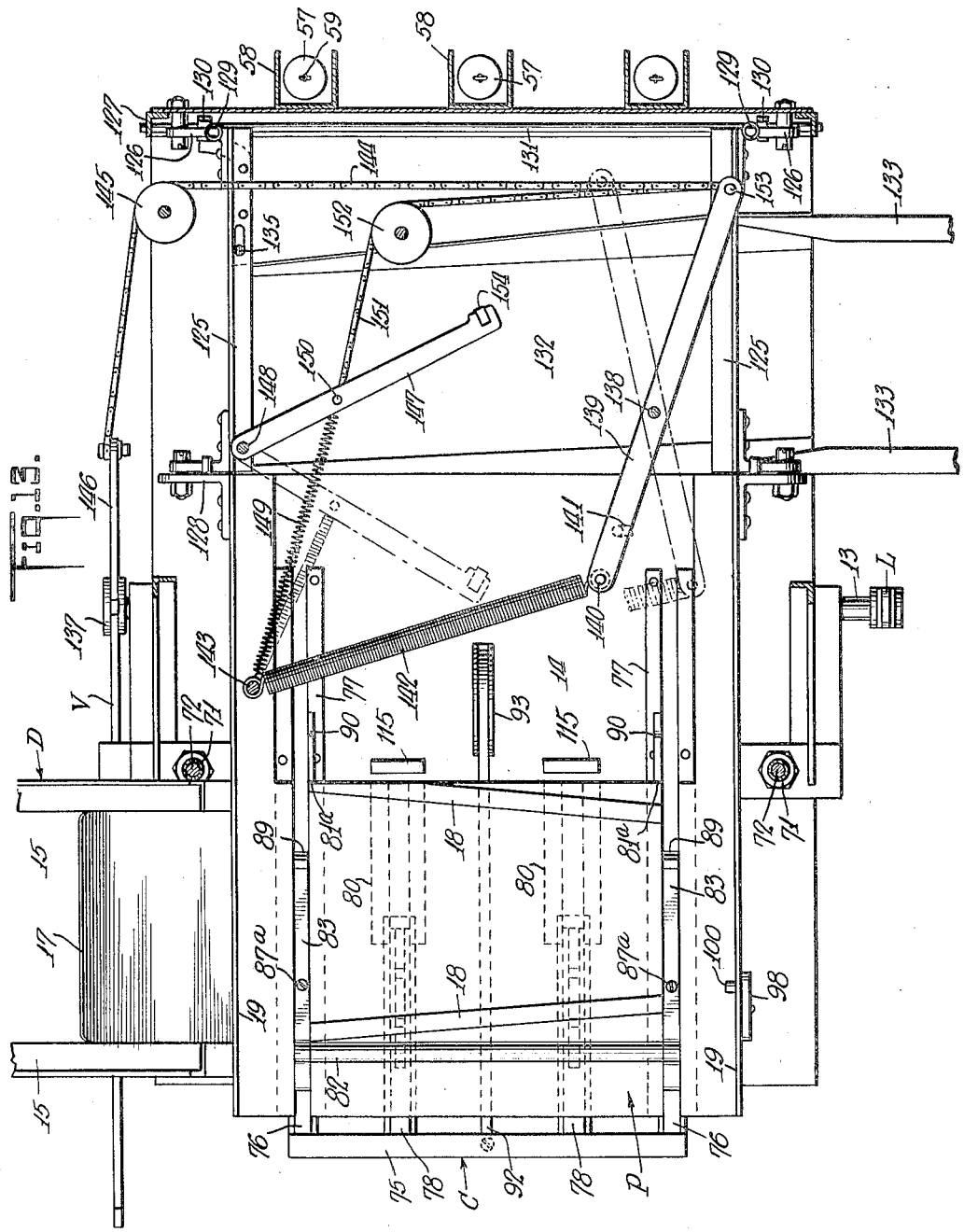
INVENTOR
*Milton Schnaier*
BY
Dean, Fairbank, Hirsch & Foster
ATTORNEYS

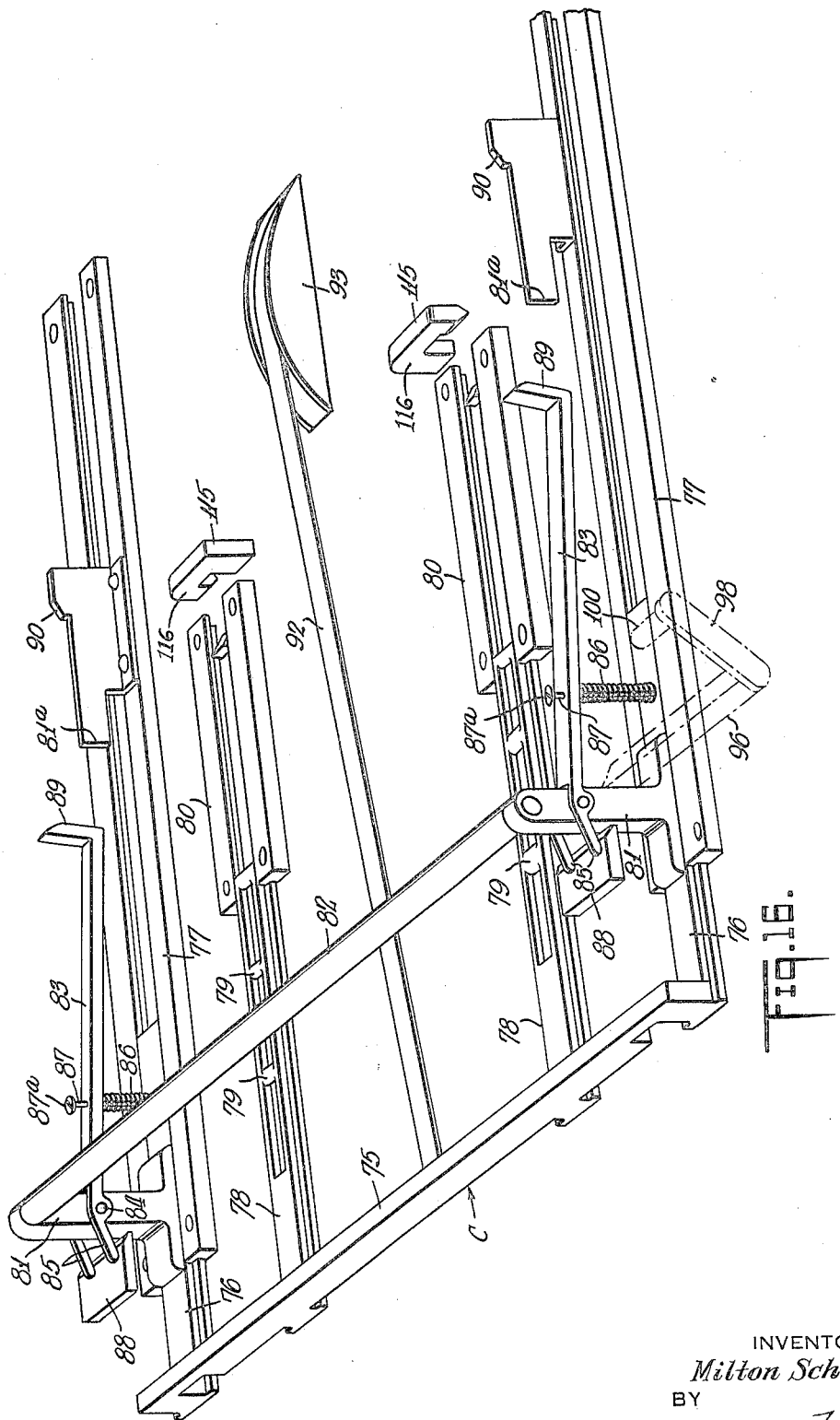

Patented Apr. 3, 1934

1,953,506

UNITED STATES PATENT OFFICE 1,953,506

ART OF FEEDING AND POSITIONING ARTICLES

Milton Schnaier, New York, N. Y.

Application February 17, 1931, Serial No. 516,525
Renewed June 30, 1933

88 Claims. (Cl. 107—7)

My present invention in its broader aspects, relates to handling, dispensing and assembling various articles or instrumentalities which are to be brought into cooperative working relationship or otherwise correlated during a manufacturing or assembling operation.

The invention is specially adapted for embodiment in a machine for dispensing a plurality of articles, such for instance, as splints or handle members, and positioning them in a predetermined relationship in an article receiver structure by which they are adapted to be gauged and centered and in which they are carried during the subsequent manufacture of handled articles.

More particularly the apparatus is not only designed to dispense or feed the articles into proper position in the receiver but also to correctly handle the receiver itself, guiding it into proper position to receive the splints, moving it step by step as successive series of splints are fed into position and finally shifting the receiver into correct assembled relationship with the articles to be assembled on the handles.

Entirely aside, however, from the utility of the machine in its entirety, there are embodied in the machine individual mechanisms capable of usefulness in various fields, such for instance, as the splint feeding mechanism, the step by step mechanism for controlling the movement of the article receiving device, the ejector mechanism for the filled receivers and the correlating mechanism for the handle carrying receivers and the articles to be assembled on the handles.

Another feature of the machine, which is also capable of embodiment in numerous other types of automatic or semi-automatic machines, is the arrangement whereby a receiving device adapted to receive and carry articles to be assembled or to be worked upon, is effective to serve as an actuating means for many of its own position or movement controlling devices which it encounters in its course of travel.

A device embodying the present invention is particularly useful in connection with the manufacture of handled articles, such for instance, as confections frozen on a stick. When used in this connection, the machine is effective to deposit in a suitable portable stick receiving gauging, centering and gripping mechanism, a series of sticks, preferably introducing one row of sticks at a time as the receiver is moved step by step. After depositing the sticks in the receiver, the machine then operates to grip all of the sticks in the receiver and to shift the receiver into proper collocated relationship with a multiple compartment mold carrying the material to be frozen about the sticks. Preferably the device is so arranged that an empty stick receiver placed upon a gravity conveyor mechanism enters the machine, is filled with sticks, is actuated to clamp the sticks and is then ejected or released from the machine with its load of sticks and then automatically correctly positioned upon the top of a multiple compartment liquid filled mold with all of the sticks correctly assembled with respect to the various mold cavities and the entire assemblage ready for freezing of the confections.

A more complete description of the details of the stick receiving mechanism may be found in my copending application, Serial No. 500,457, filed December 6, 1930. The details of a typical mold structure are found in my copending application, Serial No. 453,896, filed May 20th, 1930.

The completed confections may be of the character disclosed in the prior patent to Epperson, No. 1,505,592, or to myself, granted June 30, 1930, No. 1,764,282, and the manner in which the frozen confections are removed from the molds and packaged, forms the subject matter of my prior application, Serial No. 453,896, filed May 20, 1930.

Inasmuch as the present application is not particularly concerned with the method of freezing or packaging the confections, nor with the structure of the confections themselves, a detailed discussion of these operations becomes unnecessary and the present application will confine itself primarily to a description of the mechanism for actuating the stick receiving devices and placing and locking the sticks therein and collocating these devices with the molds.

One of the objects of the present invention is to provide a machine of the character discussed in general above, which will be of simple, practical, rugged and durable construction, well suited to withstand the duties of handling the relatively heavy stick receiving devices as well as the relatively fragile sticks and a machine which will be positive in all of its operations.

Another object is to provide a machine of this character which may be of the full automatic type but which when of semi-automatic character, will require a minimum of hand operations to accomplish the desired results and which will be capable of manipulation by an inexperienced operator, being of such fool-proof construction that incorrect operation thereof is rendered substantially impossible.

Another object is to provide a machine in which the supply magazine for the sticks, the means for feeding the sticks and the mechanism which handles the stick receiving device are compactly correlated to avoid the need for the use of cumbersome structures and to minimize the need for shifting the stick receiving devices about between the time that they enter the machine empty and the time they leave the machine filled with sticks and are deposited in assembled relationship with the liquid filled molds.

Another object is to provide a simple, effective stick magazine operative to prevent jamming of the sticks or incorrect feeding thereof and to so deliver the sticks from the magazine that the delivery action is positive and dependable and the danger of feeding no sticks at all or an incorrect number of sticks is effectively avoided.

Another object is to utilize the sticks or splints assembled in the receiving device to assist in insuring correct travel of the stick receiver from stick receiving position into assembled relationship with the mold. Thus the sticks which are to become later, part of the frozen confections, serve an additional function during the assembling operation as supports and guides for the device which carries them. The sticks are especially effective in facilitating and expediting movement of the receiver from the time it is filled and the sticks locked therein until the time that it reaches the mold in that they render possible a rapid gravity movement and relatively violent and rapid ejection of the filled receivers. This is due in large measure to the inherent ability of springy wooden sticks to collectively cushion the jolts and jars which would otherwise be transmitted to the receiver itself.

Another object is to provide a machine of this character which, even though semi-automatic in operation, operates with such facility and expedition that it may well form part of a continuous chain of operating mechanism and even an unskilled operator may readily keep pace with a rapid endless belt type of manufacturing procedure where the present machine is the only semi-automatic link of the chain.

Another object is to provide a machine which will be positive in its ability to correctly position and gauge the sticks in the receiver, to firmly clamp them in the receiver and to correctly actuate the receiver in its various movements from the time it enters the machine until the time it leaves it.

In a preferred embodiment of the device, the stick magazine is arranged above a gauging table over which a carriage for the stick receiving device is movable step by step. The stick receiver preferably descends by gravity along a suitable conveyor on to its carriage, being effective to automatically release the carriage from its normal inoperative position whereupon the carriage shifts the stick receiver under the magazine for the reception of the first set of sticks. Preferably, the stick receiver is provided with a plurality of rows of stick receiving devices to be successively filled with sticks. Preferably, also, it is equipped with means for clamping the upper ends of the sticks in the various receiving devices or holders with their lower ends all pendant a similar distance below the receiver so they may be subsequently, simultaneously inserted a predetermined distance into the liquid filled molds. The stick receiver having ridden on to its carriage and been carried thereby to position to receive the first set of sticks, one set of sticks is manually or automatically positively ejected downwardly from the magazine and emplaced in the first row of stick receiving devices. One convenient method of effecting such ejection of the sticks from the magazine includes a plurality of positive pusher elements carried on a common cross head or the like and operative to positively move individual sticks into position.

On the idle movement of the stick actuating devices toward position to engage another series of sticks, a stop mechanism for the carriage is automatically tripped and the carriage shifted forward into position for the reception of the next set of sticks. This one step advance of the stick receiver during each idle movement of the stick delivery mechanism continues until each row of stick receiving devices has been filled. Subsequently the machine actuates the clamping mechanism of the stick receiver, simultaneously clamping all of the sticks in their holders and the receiver with its plurality of pendant sticks is ejected rearwardly from the machine acting to release itself and to drop upon a gravity conveyor.

The gauging table of the machine insures that each stick will project exactly the same distance below the stick receiver. Thus the receiver is ejected from the machine carrying a complete set of pendant sticks of equal length. The presence of these sticks aids in large measure to permit the comparatively violent ejection and sharp dropping of the stick filled receiver on to the gravity conveyor since it drops upon the ends of the sticks themselves, which cooperatively cushion its fall. Continuing down this conveyor, the stick filled receiver arrives above a liquid filled mold and releasing the latch, which has thus far prevented movement of the mold along a secondary conveyor, the stick receiver automatically enters into proper collocated engagement with the mold and by its own momentum carries itself and the mold along to a position beyond the stop whereby the next mold may be brought up against the stop and the next filled stick receiver may repeat the operation.

The invention may be more fully understood from the following description in connection with the accompanying drawings wherein Fig. 1 is a top plan view of a machine embodying the invention;

Fig. 2 is a front elevational view thereof;

Fig. 3 is a transverse sectional view therethrough, taken approximately on the line 3—3 of Fig. 1, showing the position of the parts prior to the arrival of a receiver to be filled;

Fig. 4 is a transverse sectional view on the line 4—4 of Fig. 1, but showing how the stick receiver as it enters the machine, actuates the carriage release;

Fig. 4a is a sectional detail view showing the details of the latch mechanism for the carriage;

Figure 5:
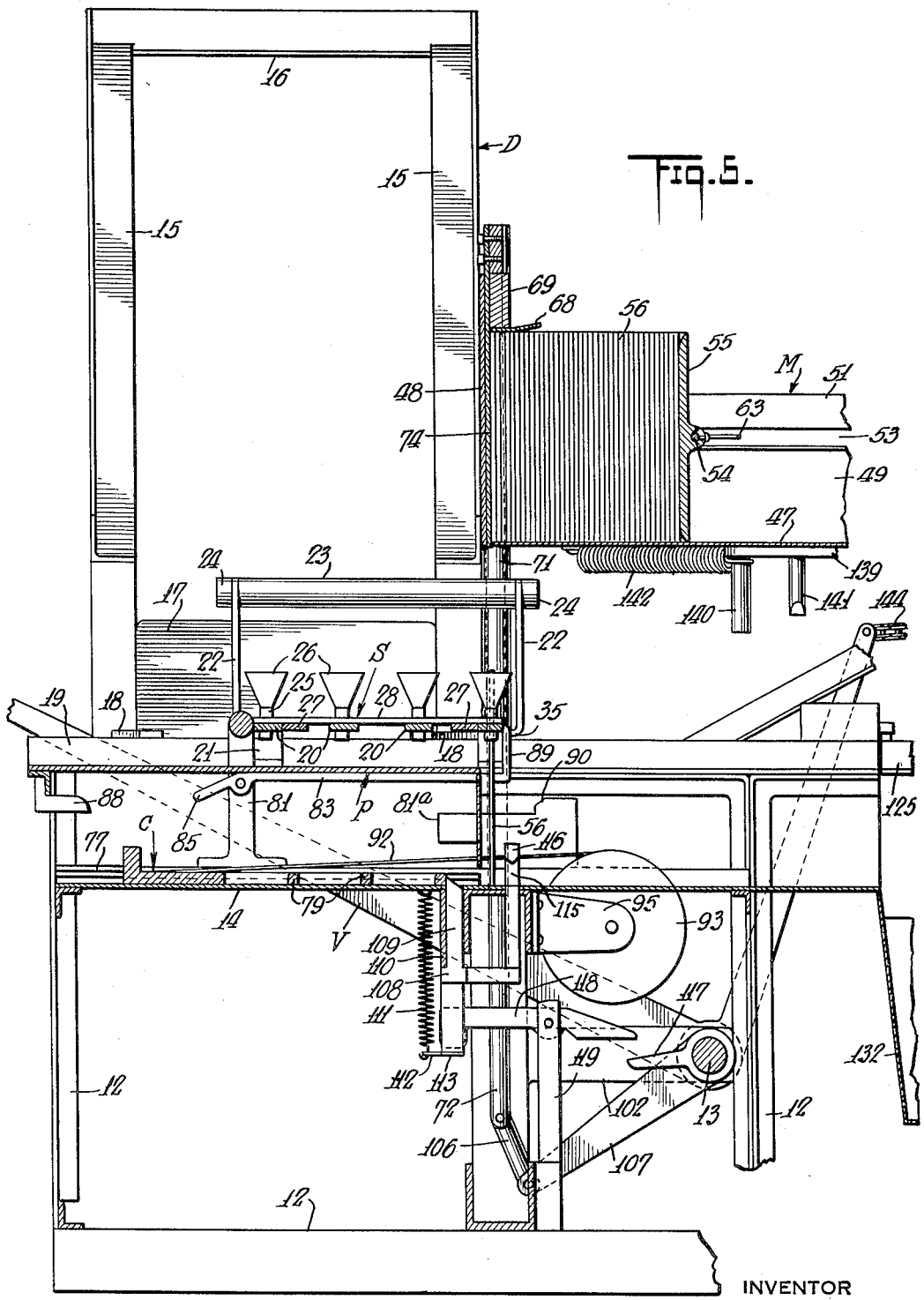
Fig. 5 is an enlarged vertical sectional detail taken on the same line as Fig. 3 and showing the position of the parts just after the first series of sticks have been deposited in the holders.

Fig. 6 is a view similar to Fig. 5 but showing the position of the parts after the rockable control shaft has completed part of its movement in a reverse direction. Here the stick feeding devices are on their way up to pick up a new set of sticks and the trip mechanism for the stick receiver carriage has been released so that this carriage has moved forward one step, to bring the next set of stick receiving devices into alignment with the discharge end of the stick magazines;

Fig. 7 is a view similar to Fig. 6 but showing the position of the parts after the stick receiver device has been completely filled and released by the carriage;

Fig. 8 is a view showing the position of the parts after the ejecter lever has been actuated to effect clamping of the sticks and to move the ejector finger into engagement with the stick receiver.

Fig. 9 is a view taken on the same line and showing the position of the parts after the ejector lever has been shifted to its other extreme position to kick the stick receiver over the discharge chute and thereby actuate the trip which releases the stick receiving device. In this view the receiving device is just ready to fall into the gravity discharge trough or chute;

Fig. 10 which is a view taken approximately on the line 10—10 of Fig. 9, shows the position of the parts an instant after the weight of the stick receiving device and sticks has caused them to drop as a unit into the receiving pan or slide. From this view, it will be noted that the rails which had supported the stick receiver over the slide, have been knocked out of place by the weight of the slide and are about to be restored to their dotted line position by the springs. This view also shows in dotted lines a subsequent position of the receiver and its clamped sticks just as it is about to engage the mold and by its own inertia, carry the mold along with it;

Fig. 11 is a side elevational detail of the mold blocker mechanism taken approximately on the line 11—11 of Fig. 10;

Fig. 12 is a transverse sectional detail taken on the line 12—12 of Fig. 11;

Fig. 13 is a plan view taken approximately on the line 13—13 of Fig. 3 and showing in full and in dotted line position, the levers which serve to first check the movement of the stick receiver, then clamp the sticks and then kick the stick receivers into position over the trough into which they drop;

Fig. 14 is a sectional detail of the release mechanism which permits the filled stick receivers to drop in the trough or gravity conveyor;

Fig. 15 is a transverse sectional view on the line 15—15 of Fig. 14;

Fig. 16 is a perspective view of the carriage and its guide and stop structure, with all associated parts omitted for the sake of clarity.

The machine may be mounted upon a suitable carrier frame such as the table 10 (Fig. 2) from which rise standards 11, mounting a hollow angle iron frame work 12 of skeleton formation, which provides bearings for the main operating shaft 13. This frame work may be of any suitable rigid construction and for the sake of brevity its various constituent elements are not described in detail. Above this shaft and mounted on the skeleton frame is a bed plate and gauging table 14. Over this table, the carriage, indicated generally at C, for the stick receiving device, indicated generally at S, is movable. Suitably supported at the proper distance above the gauging table, is the stick magazine indicated generally at M. The multiple compartment molds A, one of which is shown at Fig. 2, are carried by any suitable mechanism along a track or conveyor T, which may be supported at least in part, upon the table 10. These molds move along the track and under the frame structure 12, finally abutting the releasable stop mechanism indicated generally at B.

The means for guiding the stick receiver S into position upon the carriage C, may conveniently comprise an inclined trackway D, disposed laterally of the machine and supported therefrom upon suitable angle iron braces E. As best seen in Fig. 1, the track D consists of angle bars 15 rigidly spaced apart by suitable cross members 16. One of the stick receivers S placed upon the outer, upper end of the track D slides end foremost down this track and with the assistance of an inclined guide plate 17 arranged adjacent the receiving platform P of the machine, is guided by the converging rails 18 into proper position to be received by the carriage C and to release the carriage as will be later explained. The rails 18 are fixd upon the platform P, which is spaced above the bed plate of the machine and carried by side plates 19 rising from the bed plate 14.

*The stick receiver device*

Before proceeding with a detailed discussion of the machine itself, I shall explain the structure of one typical form of stick receiving mechanism of the general character disclosed in my copending application, Serial No. 500,457, filed December 6th, 1930, which mechanism may be conveniently utilized in connection with the present apparatus. The stick receiver is not claimed per se in this application. The receiver appears in nearly all figures of the drawings, but its general construction can best be understood by reference to Figs. 9 and 10.

It consists of a plurality of rigid spaced parallel longitudinal bars 20, the ends of which are secured upon the intermediate portions of U-shaped brackets 35. The upstanding bracket legs 22 support cross handles 23 between them and at the ends of these handles, outwardly beyond the bracket legs, there are rollers 24. Each of the elongated bars 20 is formed with a series of openings to receive the reduced flattened necks 25 of funnels 26 which serve as the individual stick holders. Slidably mounted on the frame work defined by the bars 20 and the U brackets, are a pair of elongated bars 27 connected by cross members 28 carrying the gripper knives 29 (Fig. 10) adapted to enter slots 30 in the funnel necks and engage the sticks 56 which have been dropped in the holders.

The means for actuating this slidable stick clamping structure is illustratively shown as a U-shaped handle member 31, the legs 32 of which are formed as bell crank members and pivoted in the ends of a block 33 on the under side of certain of the frame bars 20. The ends of these bell cranks are pivotally connected to the ends of short links 34 which in turn are pivotally connected to the slidable clamping carriage whereby a toggle lever action is had so that as the handle member 31 is swung on its pivots toward the main frame of the stick receiver, the clamping bars 28 are withdrawn from the funnels and as the handle 31 is swung to vertical position, the toggle lever action slides the clamping carriage and causes all of the knives 29 of the clamping bars 28 to enter the funnel and engage the sticks 56 which are disposed therein.

The ends of the outermost pair of fixed rails 20 are turned under as indicated at 21 to provide hooked shaped feet at each corner of the stick receiver.

When the stick receiver is placed in the upper ends of the inclined conveyor rails 15, it is supported only by the four rollers 24 at its upper corners, and these rollers of course, facilitate the gravity travel of the receiver into position on the platform where the feet 21 are guided by the converging rails 18.

The molds

Before describing the action of the machine, it may also be well to briefly note the general construction of the molds A, best seen in Fig. 10.

It will be understood, however, that like the stick carrier devices, these molds are not claimed specifically herein and reference may be had to co-pending application of Thomas, Serial No. 433,608, filed March 6, 1930, and to my copending application, Serial No. 453,896 filed May 20th, 1930, for a more complete understanding of the details of the mold structure. Each of these molds consists of a pan or trough 40 having pendant therefrom, a plurality of individual mold forms 41, the mouths of which are open into the trough. These mold forms may be connected at their bottoms by suitable braces (not shown) and the whole structure is arranged to slide on runners 43, adapted to travel on the spaced pairs of angle irons 45, which constitute the mold track T, and which are connected by suitable cross braces 46.

It will be understood, of course, that by pouring the syrup or other material to be frozen into the mold pans, all of the molds are filled or partially filled with syrup and then are ready to receive the handle sticks 56.

The purpose of the present machine is to fill the stick receivers with handle sticks and then carry them along and properly collocate them with the molds, the stick receiver fitting within the pan of the mold and the sticks depending the correct distance into the material to be frozen, whereupon during a subsequent freezing operation, the sticks and the material become bonded together.

The stick magazine

The construction of the magazine which carries the sticks or splints prior to the time that they are fed to the stick receiver, is best seen in Figs. 1, 3 and 10. The magazine indicated generally at M is provided with a flat bed plate 47 and with an upstanding front plate 48. Rising from the bed plate and extending longitudinally thereof, are a plurality of pairs of channel forming flanges 49 cooperatively defining narrow stick receiving channels 50. The channels 50 are likewise arranged in pairs as best seen from the cross sectional view of Fig. 10, and the outermost channel forming flanges 49 of each pair of channels, are provided with vertically spaced extensions 51, connected to the main lower sections of the flanges by brackets 52, and cooperating with said main sections to define the longitudinal slots 53. These slots serve to accommodate the ends of cross pins 54 riding on the lower channel forming flanges of each pair of channels and carrying pivoted pusher or follower members 55 which travel in the channels 50 and are adapted to urge a row of sticks, such as 56, up against the forward upright plate 48 of the magazine.

Counterweights 57 traveling in guides 58, pendant from the rear of the magazine, are connected to flexible devices 59 traveling over pulleys 60 arranged at the rear end of the magazine between the respective channels of each pair. The flexible devices are led around pulleys 61 mounted in brackets 62, struck outwardly from the face of the plate 48, and are carried back and attached to the intermediate portions of the cross pins 54 at the centers of the latter.

Each cross pin 54 is provided with a rearwardly extending handle 63 adapted to be manually grasped in order to withdraw the cross pins along their channels 53 against the action of the weights 57. As best seen in Fig. 3, each of the channel guides 58 for the weights, is provided with a pair of notches 64 in its rearwardly extending flanged edges, these notches being located adjacent the tops of the guides. When it becomes necessary to replenish the sticks or splints 56 in the magazine or rather in the various individual magazines defined by the channels 50, the handles 63 are grasped and the cross pins 54 together with their connected pushers 55, are fully withdrawn and the ends of the cross pins engaged in the notches 64. With the cross pins in this position, which is indicated in dotted lines in Fig. 3, the stick receiving channels are entirely open and a plurality of sticks may be emplaced in the channels 50. The channels as is apparent from Fig. 3, are of the same width as the width of the flat stick members or splints to be dispensed and the sticks are arranged on end and back to back in the channels, in which position, the rearmost stick is engaged by its pusher 55, the counterweights 57 acting continually to feed the row of sticks forwardly in each channel of the magazine.

It may be desirable to provide some means for holding the last sticks of a newly inserted row against toppling over after these sticks have been emplaced and before the cross pins 54 have been withdrawn from the notches 64 and repositioned to act on the sticks. With this in view, a simple type of retaining mechanism may be provided, this mechanism consisting of a flat spring 65 having one end pivotally secured at 66 to the outer face of one flange 49 in each channel and carrying at its free end, a pin 67 adapted to work through a suitable opening 68 in the flange 49 and block rearward toppling movement of the last sticks in a row. When these latches are not in use, the pins are withdrawn and the springs slightly turned on their pivots to bring the pins out of registration with the holes of the flange and render the latches inactive.

The sticks 56 are of equal length but should one of the sticks become vertically disaligned from the rest of the sticks which are being fed, a guiding cam 68 attached to a rigid cross bar 69 at the top of the plate 48 and above the sticks, will automatically serve to depress the elevated stick as it approaches its dispensing position.

At the forward end of each channel, the base plate 47 of the magazine is provided with an opening or slot 70 of slightly greater width than the thickness of one stick and of less width than the combined thicknesses of two sticks. The cross bar 69 is carried upon the upper end of a pair of hollow standards 71 rising from the frame work 12 and traveling in these standards are the actuating and guiding rods 72 of a cross head 73, which cross head carries a plurality of rigid pendant pusher or ejector fingers 74, the lower ends of which are guided between the cross bar 69 and the front plate 48 of the stick magazine. These pushers or ejectors operate upon each downward movement of the cross head 73 to engage the forward stick 56 in each stick magazine channel and push said sticks downwardly through the slots 70. Each pusher is of the proper size and shape to engage the upper end of a stick and the stroke of the cross head is sufficiently great to permit the pushers to be positive in their action, that is to say, the pushers travel all the way from their fully elevated position of Fig. 3 to their fully depressed position of Fig. 5, in which the lower end of the pusher actually extends through the slot 70, thereby eliminating any danger of incomplete ejection of the stick which is being acted upon.

It is desirable that the weights which serve to maintain the desired pressure against the rear end of each row of sticks, relatively heavy and that a substantial pressure be applied, first because this pressure must be sufficient to prevent the foremost stick of each row from falling by gravity through the slots 70 and secondly, because these light wooden sticks have a not inconsiderable tendency to warp, especially under certain weather conditions. Whether the applied feeding pressure is great enough, the warped sticks are maintained straightened out so that each stick as it comes to the front of the magazine, is forced firmly and flatly against the front plate 48 in proper position to be subsequently ejected downwardly by its pusher 74.

The stick feeding or ejecting mechanism is of course, accurately synchronized with the mechanism which moves the stick receiver S, step by step across platform P.

Before describing such synchronizing means and the actuating means for the pusher carrying cross head 73, I shall describe the means for effecting and controlling the movement of the stick receiver from the time it descends onto the platform until the time it has been filled with sticks.

*The carriage and its latch mechanism*

As suggested above, when the stick receiver S descends upon the platform P, it is received by a carriage mechanism C and moved step by step under the stick magazine by the carriage. For a clearer understanding of the successive movements of the stick receiver therefor, it becomes necessary to describe the carriage which actuates this receiver and the mechanism which controls the movement of the carriage.

The carriage in various positions, appears in practically every figure of the drawings, but I have shown in Fig. 16, a perspective view of the carriage and its mounting on the bed plate and gauging table of the machine with all adjacent parts omitted so that the construction of the carriage and the arrangement of the controlling cams for the movable carrier arms may clearly appear. From this figure, it will be observed that the carriage includes a rigid cross bar 75, to the ends of which are connected the ends of a pair of slide bars 76. These bars are of dovetailed shape in transverse section and slide within pairs of correspondingly under-cut guide rails 77 mounted upon the bed plate of the machine. Between the rails 76, and parallel with them, are a pair of sliding arms 78 having their rear ends rigidly affixed to the cross bar, and their forward ends slotted to define pairs of spaced rails, connected at intervals by cross pieces or spacers 79, adapted to coact with a carriage stop mechanism to be later described. The rails 78 like the rails 76, may be of a cross sectional shape to properly key into corresponding guide rails 80 also fixed to the bed plate of the machine.

Mounted upon the rails 76 are a pair of standards 81 connected at their upper ends by a cross bar 82. A pair of levers 83 have their bifurcated rear ends straddling and pivoted to the standards below the cross bar as indicated at 84 and the furcations extend as heel pieces 85, adapted for coaction with suitable stationary cams to be later described. The levers 83 are normally spring urged into horizontal position by coiled expansion springs 86 encircling upstanding screws 87, which pass loosely through the levers and are fixed in the slide bars 76. The heads 81a of these screws limit the spring urged forward movement of the levers 83.

Affixed to the frame work 12 of the machine at the front thereof, are a pair of stationary cams 88, with which the heel pieces 85 of the levers 83 are adapted to coact as the carriage is drawn to its extreme forward position. It will be apparent as the heel pieces 85 of the levers ride up on the cams 88, they will act to depress the levers 83 and to thereby swing the upturned lever ends 89 below the slots 90 in the platform P (Fig. 3). These slots allow for movement of the standards 81 and the up-turned lever ends 89 during actuation of the carriage.

Near the rear end of the bed plate, I provide another pair of stationary cams 90, also adapted to coact with the heel pieces 85 so that as the carriage approaches its rearmost position, the heel pieces will again be elevated to depress the upturned lever ends 89 for a purpose which will more fully hereinafter appear. Movement of the carriage in a rearward direction is limited by engagement of the cross bars 75 with the stops 81a integral with cams 90. Spring tension is constantly applied to the carriage to urge it from its forward position to its rearmost position. For this purpose, I have illustratively shown a steel tape 92 wound upon a spring reel 93 having suitable bearings at 94 (Fig. 3) in a bracket 95, fixed to the frame work 12 below the bed plate 14.

Means is provided for normally latching the carriage in its extreme forward position against rearward movement under influence of the spring. This latch mechanism is shown in detail in Fig. 4a. It consists of a blocker arm 96 sliding in a sleeve 97, affixed to the frame work of the machine laterally of the carriage. This blocker arm is connected to a cross piece 98 arranged exteriorly of the machine frame plate 99, the end of the arm 98 carrying a push button 100 which projects inwardly through the side frame 99. A spring 101 normally tends to draw the latch bar 96 inwardly into a position where it engages one of the standards 81 and latches the carriage against movement. The spring latch mechanism is automatically kicked out of the way until the standard has passed it upon a retractive movement of the carriage, whereupon it again snaps into latching position.

*Interaction of receiver and carriage*

As the stick receiver descends from its guides, it becomes interlocked with the carriage C and is positively actuated by said carriage throughout its step by step movement under the stick feeding magazine. The effective width of the stick receiver, that is to say, the overall width including the two outermost rigid frame bars, corresponds with substantial exactness with the distance between the standards 81 and the upturned ends 89 of the levers 83 so that when the stick receiver rides on to the platform P under the direction of the guide bars 18, and the carriage C moves rearwardly until levers 83 are released by cams 88, and spring upwardly, the two side bars of the stick receiver will be securely locked between the handle rail 82 and the upturned lever ends 89. It will be understood that I have called the assemblage C a carriage for the stick receiver and in this sense, have used the term carriage rather loosely since the weight of the stick receiver is always upon the platform P, but all of the movements of the stick receiver while upon this table, are controlled by the carriage which interlocks with the receiver.

It will be apparent from Fig. 1, that as the stick receiver slides down on to the table, its momentum will carry it forwardly until one foot 21 strikes the release button 100 and withdraws the latch bar 96. As this occurs, the carriage will jump rearwardly under the impetus of its spring, the hand rail 32 carrying the stick receiver along, and as the tail pieces of the levers 83 ride off the cams 88, these levers will be snapped to horizontal position by their springs 86 and the upturned lever ends 89 will jump into position immediately in front of the advancing edge of the stick receiver.

The carriage stop mechanism

I have provided a special type of stop mechanism which is effective first, to check the original spring impelled movement of the carriage where the first row of stick receiving devices are in proper registration with the slots 70 of the stick magazine to receive a set of sticks, secondly, to automatically check a plurality of further spring urged movements of the carriage at points where successive rows of stick receivers will line up with the delivery slots of the stick magazine, and thirdly, to release the carriage and let it move rearwardly against the stops 81a, thereby releasing the stick receiver from the carriage and leaving the carriage free to be handled by the stick clamping and carriage ejecting mechanism to be later described.

This stop mechanism is of course, properly synchronized with the stick feeding mechanism and is so operated that upon each idle stroke of the cross head 13, the carriage and stick receiver will move forward one step and upon each working stroke of the cross head, the carriage and its controlled stick receiver will remain stationary.

I have previously referred to the control shaft 13 of the machine which is mounted in substantial bearings 102, constituting part of the frame work 12. Affixed to one end of this control shaft is a handle lever L which is disposed at the side of the machine. This lever is rockable back and forth to a limited extent and the main shaft which is rocked by its oscillation, serves to control both the stick feeding mechanism and the carriage stop mechanism. The connections between the main shaft and the vertically sliding rods 72 of the cross head 73 may be clearly seen from Fig. 5. The lower end of each slide rod 72 is pivoted to one end of a short link 106 and the other end of each of these links is pivotally connected to the end of a crank arm 107 rigidly affixed upon the rockable main shaft 13 and sufficiently long so that a relatively slight rocking of the shaft 13, will be effective to impart to the cross head through the link 106 and rod 72, the desired range of movement. The carriage stop mechanism which is also controlled from this shaft, includes a cross arm or cross bar 108, (Figs. 1 and 3) mounted below the bed plate 14 of the machine and carrying a pair of upwardly projecting stop lugs 109 movable through the bed plate of the machine between the guide rails 80 and into position to block the forward movement of the cross pieces 79 of the carriage rails 78. Suitable guide sleeves 110 may be provided to guide the vertical movement of the stops 109 and to limit the upward movement of the cross bar under the influence of a coiled contractile spring 111, normally tending to elevate the bar. This spring is anchored at its upper end to the bed plate and at its lower end to a lug 112, projecting from a stirrup 113 pendant from the cross bar 108. Projecting rearwardly from the cross bar, are a pair of arms 114 which carry upwardly extending bars 115, also working through the bed plate of the machine but out of the path of the carriage slides 78. The bars 115 above the bed of the machine, are provided with laterally extending downwardly turned hooked portions 116, which are disposed in the path of travel of the carriage rails 78 at times when the members 109 are depressed. The arrangement is such that upon downward movement of the cross bar 108, stops 109 are withdrawn under the table and become inoperative and stops 116 block the forward travel of the carriage. When the bar 108 is in its elevated position, however, the stops 116 are too high above the table to block such movement and the stops 109, projecting between the rails 80, serve as the blockers. It will thus be seen that, if the bar 108 is pulled down, the forward stop will be withdrawn, permitting the carriage spring to advance the carriage to a position where it is again stopped by the members 116. It is to be noted, however, that before the stops 109 have been fully retracted, the stops 116 will be in blocking position and vice versa.

The means for imparting the desired up and down motion to the stop carrying bar 108, at properly timed intervals to effect the release and blocking of the carriage C, is also actuated from the main shaft 13 and consists of a finger 117, pinned on the main shaft and having its free end engageable with the end of a tilting lever 118 fulcrumed in a standard 119 rising from the frame work 12. One end of the lever 118 is disposed within the stirrup 113. Thus, as the main shaft 13 is rocked from the position of Fig. 5 to the position of Fig. 6, finger 117 elevates the rear end of the lever 118 and rocks this lever so that the forward end thereof depresses the stirrup and draws down the stop carrying bar 108, thus drawing the forward stops 109 below the surface of the bed plate and bringing the rear stops 116 into carriage blocking position.

The position of the parts prior to the time that the stick receiver slides down the track and trips the carriage, is shown in Fig. 3, wherein it will be noted that the carriage C is fully retracted and latched. The levers 83 are held in depressed position by the cams 88 and the stop carrying bar 108 is held in its uppermost position by the spring 111, forward stops 109 being in blocking position and rear stops 116 being elevated. As suggested above, when the stick receiver is placed on the chute D, it slides down on to the platform P, and is guided across this platform by the rails 18, until one of the feet 21 of the receiver, strikes the push button 100 and releases the latch bar 96. Thereupon the carriage C is drawn smartly forward by its spring. The cross bar 82 picks up the carriage and the lever ends 89 spring in front of the carriage, the latter traveling rearwardly under the influence of its spring until the rearmost pair of members 79 abut their respective stops 109, the parts coming to rest in the position shown in Fig. 5, with the first set of funnels for the sticks arranged directly under the discharge openings 70 of the stick magazine. As the lever L is pulled downwardly, it actuates the cross head 73 through the medium of crank arms 107, links 106, and rods 72, and the first stick in each magazine channel is ejected downwardly and drops into its funnel, coming to rest upon the bed plate of the machine, which serves as a gauging table in order that all of the sticks which are inserted in the receiver, may project to the same distance therebelow.

In Fig. 5, the lever L (not shown) has reached its fully depressed forward position, and the rods 72 have been pulled all the way down and the sticks ejected into the first row of stick receiving funnels. In this counterclockwise rocking of the shaft 113, it will be seen that the finger 117 has idly tilted the lever 118 without in any manner affecting the position of the stops. Upon a reverse movement of the lever L, the cross head carrying the stick pushers, starts upwardly upon its idle stroke and during this stroke, the finger 117 actuates the lever 118 to depress the stop carriage.

In Fig. 6, the parts are shown in a position where part of the upward and rearward swing of the lever L have been completed and the stop carriage has been depressed and the finger 117 is just about to release the stop carriage depressing lever 118. From this figure, it will be apparent that as the forward stops 109 pass below the bed plate, the carriage C will spring rearwardly and the rearmost members 79 will engage the rear stops 116. As the lever L continues on its way and the stop carriage actuating lever 118, is released, the stop mechanism will spring smartly upwardly and as the rear stops 115 clear the members 79, the forward stops 109 will jump into position to block the next set of members 79 after the carriage has been advanced a slight distance further by its spring. The second set of stick receiving funnels are not brought under the hopper until the second set of cross pieces 79 are in engagement with the forward stops 109.

The distance between stops 116 and 109 measured from the front to the rear of the machine is less than the distance between the associated cross pieces 79 on the slides 78 and it will be apparent that the function of the rear stops is to check the carriage after it has partially completed a step forward and hold it until the front stops again reach operative position to block the next advancing set of cross pieces 79. I have not shown the position of the parts where the second set of funnels are in line with the hopper, but it will be apparent that a slightly further movement of the lever L from the position of Fig. 6 will cause the parts to move to this position as hereinbefore described.

Neither have I shown the positions where the third and fourth set of stick receiving funnels are in line with the hopper but it will be apparent that successive forward and rearward movements of the lever L will be effective on each forward movement to feed sticks into one set of hoppers or funnels, and on each rearward movement, to advance the carriage one step and bring the next row of stick receiving funnels into stick receiving position.

Fig. 7 of the drawings shows the position of the parts after the last cross bar 79 has cleared the stops and the final movement of the lever L has permitted the carriage to jump rearwardly to its extreme position where the cross bar 75 has come into abutment with its stops 81a. During this movement, the tail pieces 85 of the levers 83 have ridden on to the cams 90 and the lever ends 89 have again been depressed so that the completely filled stick carriage is in a position to have the sticks clamped and to be finally ejected from the machine.

Stick clamping and receiver ejecting mechanism

I shall now describe the apparatus which checks the movement of the stick receiver in the position of Fig. 7, after the levers 83 have been depressed and which is subsequently operative to swing the clamping handle of the receiver to stick clamping position to engage the receiver and to forcibly eject it from the machine.

As best seen in Figs. 3, 10 and 13, there are provided at the rear end of the machine displaceable angle iron tracks 125, constituting continuations of the edges of platform P upon which the feet of the stick receiver travel during the time that the receiver is being actuated by the carriage C. These tracks are carried by brackets 126 projecting inwardly from standards 127 and 128, said standards forming part of the support structure for the stick magazine. Coiled contractile springs 129 are engageable with the brackets 126 and tend to hold them in elevated position with the tracks 125 in horizontal alignment with the platform P.

Normally the downward swinging movement of the brackets 126 is positively blocked by a pair of upstanding fingers 130 carried by a rock shaft 131 journaled in the rear pair of standards 127. As the stick receiver, however, is forcibly slid on to the rails 125 by a mechanism which will be hereinafter described, it serves to actuate a trip mechanism which moves the fingers 130 out from under the brackets 126 and permits the weight of the stick receiver to displace the rails 125 as shown in Fig. 10, and to drop by gravity into the inclined pan or chute 132 from whence it passes to the gravity discharge track 133.

The trip mechanism which controls the displacement of the fingers 130, 130, is shown in detail in Fig. 14, wherein it will be noted that one of the rails 125 has a plate 134, slidably mounted thereunder, this plate carrying an upwardly projecting button or trip 135 which extends through the bar 125 and into the path of movement of the receiver. As the receiver strikes this button, the slide 134 is shifted rearwardly, kicking one of the fingers 30 out from under the bracket 126 and acting through the rock shaft 131 to simultaneously displace the other finger 130 and leave the tracks 125 unsupported except by the springs 129. After the stick receiver has displaced the tracks 125 and dropped by its own weight, as shown in Fig. 10, springs 129 serve to restore the tracks to their normal position and the spring 136 acting on one of the arms 130 shifts these arms into blocking position and restores the sliding latch 134.

The mechanism for operating the stick clamping handle 31 and for shifting the stick receiver on to the rails 125 from which the receiver discharges itself, is controlled by lever V, affixed upon a hub 137 freely rotatable on the end of the main shaft 113, remote from the lever L. That is, as the operator faces the machine, the lever L is at the right and the lever V at the left of the machine.

Pivoted intermediate its ends at 138, on the under face of the magazine base plate 47 to oscillate in a horizontal plane, is a lever 139 provided at its forward end with a pendant pin or stud 140 to actuate the stick clamping handle 31 and adjacent said end with a second pendant pin or stud 141, which serves to block rearward movement of the stick receiver in the position of Fig. 7. Such movement is blocked by the engagement of the clamping handle with the pin 141.

The lever 139 is normally drawn to the full line position of Fig. 13 by a coil spring 142 anchored at 143, and the lever may be positively actuated against the action of the spring by a flexible device such as the chain 144 connected to the rear end of the lever 139, trained around a pulley 145, and attached to a crank arm 146 projecting from the hub 137 of the lever B.

A second lever 147 is fulcrumed as at 148 at one end under the base plate of the stick magazine. This lever is also mounted to swing in a horizontal plane. A relatively weak coil spring 149 also anchored at 143 and engaged at 150, with the intermediate portion of the lever, tends to draw this lever to the dotted line position of Fig. 13. Connected at 150, to the lever 147 is a flexible device such as the chain 151, trained around pulley 152 and attached to the rear end of the lever 138 at 153. Thus, although the spring 149 normally urges the lever 147 to the dotted line position of Fig. 13, the lever is held against movement toward such position by the chain 151 which is under the influence of the stronger spring 142.

Carried by the free end of the lever 147 is a pendant finger 154. The upper end of this finger is so pivoted in the lever end that the finger may swing rearwardly as the lever 147 comes forwardly, but is blocked from swinging forwardly as the lever 147 moves rearwardly. The purpose of this finger is to engage the stick receiving device upon movement of the lever 147 in one direction and then to drag this stick receiver on to the rails 125 upon reverse spring impelled movement of the lever 147.

The operation of this train of mechanism is as follows: When the lever V is swung forwardly and downwardly it pulls on the flexible device 144, thereby shifting the lever 139 from its full line to its dotted line position of Fig. 13, against the action of spring 142. During this movement of the lever, the pin 140 swings the stick clamping handle of the stick receiver into stick clamping position. This pull of the chain 44 also produces slack in the chain 151 and permits the spring 149 to shift lever 147 from its full line to its dotted line position of Fig. 13, thereby causing the finger 154 to engage one of the main frame bars 20 of the stick receiver, this finger yielding freely as it is moved in a forward direction, and of course, being self-locking against movement in the opposite direction.

Upon a reverse operation of the lever V, that is to say, when the lever V is manually released, the spring 142 cames into play and snaps the parts back to the full line position of Fig. 13. Upon this spring impelled movement of lever V, the finger 154 moves the stick receiver smartly toward the rear of the machine, sliding it on to the rails 25 where the stick receiver by its own momentum operates the latch 135 and by its own weight falls into the inclined pan or chute, 132, the weight of the receiver being taken upon the ends of the clamped sticks which collectively are sufficiently strong to allow for this drop without breaking, and which are sufficiently springy to cushion the fall of the receiver.

It will be understood, of course, that the shifting of the clamping handle on the stick receiver to clamping position by the pin 140, has rendered the pin 141 inoperative to further serve as a stop, so that there is nothing to impede the smart rearward snap of the stick receiver on to the rails 125.

The trackway 133 down which the stick receiver slides from the pan or trough 132, is of generally similar construction to the trackways T along which the molds are fed, except that in the former trackway, the angle irons are arranged to present horizontal flanges at their tops, upon which the rollers 24 of the stick receiving devices are adapted to travel. The angle iron rails which constitute the track 133 incline downwardly from the trough 132, being attached to the upper ends of standards 160, rising from the rails which constitute the mold track T.

*Mold stop mechanism*

It is upon these standards that the stop mechanism for the molds designated generally at B, is affixed. The details of this stop mechanism can be best seen from Figs. 11 and 12, wherein it will be noted that I have provided a lever 161 fulcrumed at its upper end upon a screw 162 at the top of the standards 160. The lower end of this lever is provided with an arcuate extension 163 having a slot 164 therein, which coacts with a headed stud 165, fixed to the standard to limit the extent of rocking of the lever 161 about its pivot. This lever is normally rocked to the position illustrated in Fig. 11 by the operating spring 166. The lever carries a laterally projecting latch arm 167, having a cam face 168 (Fig. 12) to be engaged by the stick receiving device as it slides down the track 133 and to be kicked aside so that the stick receiver may pass, carrying with it the mold M, which has been checked by the lower arm 163 of the stop.

Referring to Fig. 10, it will be seen that as the stick receiver drops into the inclined pan or trough 132, it will continue down this pan by gravity, the rollers 24 of the receiver handles 23 riding on the rails of the track 133 and the receiver descending rapidly until it strikes the camming face 168 of the mold blocker mechanism B, whereupon this latch is kicked aside, and the stick receiver, striking the upstanding flange of the mold pan, carries the mold along with it by momentum.

The track 133 converges toward the track T so that continued gravity descent of the stick receiver causes the receiver to enter the mold and become interengaged therewith, track 133 straightening out so that the receiver and the mold come to rest beyond the self restoring blocker mechanism B, with the receiver properly interlocked with the mold and with the various sticks which it carries centered with respect to the mold cavities 41.

The mold and the receiver are then withdrawn from the tracks T, 133 and transferred to a freezing chamber, where the remaining operations of freezing the confections, and removing them from the molds and packaging them, may be completed. Effective mechanism for performing these finishing operations in the manufacture of the confections, is disclosed in my copending application, Serial No. 453,896 above identified.

It is believed that the operation of the machine will have largely become apparent from the foregoing description, but a brief résumé thereof is as follows:

Assuming that the parts of the machine are in the position illustrated in Fig. 3, an empty stick receiver S is placed on the track D and gravitationally descends on to the platform P, one of the feet 21 of the receiver striking the push button 100 and releasing the carriage C so that the carriage and the receiver are drawn by the carriage actuating spring to the position shown in Fig. 5 of the drawings. The right hand lever L is then pulled downwardly and forwardly causing a series of sticks to be dropped into the first set of stick receiving funnels and as the lever is returned to its normal position, the stop mechanism acts in the manner above described to permit advance of the stick receiver one step. Repeated operations of the lever cause the deposit of additional rows of sticks in the receiver and further step by step advance thereof. After the last set of funnels have received their sticks, however, the reverse movement of the lever releases the carriage C, causing it to jump to the position illustrated in Fig. 7, where the carriage movement is blocked by the stops 81a and further movement of the receiver is checked by the pin 141.

It will be understood that the receiver in its passage through the machine, travels on the platform P and the standards 81 and lever arms 89 of the carriage work through the slots therein. Having reached the position of Fig. 7, the lever V is drawn forwardly, thereby acting to engage the finger 154 with the stick receiver and through the intermediacy of the pin 140, to throw the clamp handle 31 to stick clamping position. As the lever V is released, the energy stored in the spring 142 becomes operative through the finger 154 to shift the entire stick receiver rearwardly with some force on to the displaceable rails 125, the stick receiver engaging the latch 135, displacing fingers 130 and by its own weight, displacing the rails 125 and dropping into the trough 132, upon the lower ends of the sticks. From this trough, the receiver immediately slides down the track 133, trips the latch mechanism B and continuing on by momentum, carries with it the mold, the converging tracks 133 and T, serving to effect proper interlocking and centering of the pendant sticks of the receiver and the cavities of the mold. Preferably, the angle of the track 133 is so calculated that the speed and momentum of the gravitationally descending stick receiver is merely sufficient to pick up the mold and carry it slightly beyond the blocking mechanism B, whereupon the mold and stick receiver with which it is engaged, will stop by their own inertia and may be removed in any desired manner and transferred to the freezing tanks.

It will be apparent from the foregoing description that the machine of the present invention is capable of a wide and varied range of utility, particularly in connection with the manufacturing or assembling operations where a plurality of articles are to be fed into receivers, moved step by step under the article magazine.

It will be understood that after one stick receiver has gone through the machine, the carriage C is manually retracted and latched in the position of Fig. 3 by simply grasping the handle and pulling the carriage forwardly. The various steps 79 of the slide bars 80 cam over the latch members 109 during this operation. It will be evident that with a machine of this character, one operator may readily keep pace with a manufacturing system operating on an endless belt basis since the only operations necessary in connection with the feed and ejection of each receiver as it comes to the machine, are four complete strokes of the lever L, followed by one forward stroke and spring return of the lever V, followed by the manual retraction of the carriage C into position to engage the next receiver.

For the sake of clarity of illustration, I have omitted showing most of the enclosing plates and casing sections which in practice are utilized to protect and conceal most of the working parts of the machine. Also since the machine frame work may obviously be designed in many ways to provide the necessary support structure, I have discussed only such parts of the frame structure as seemed essential to a clear understanding of the invention.

It will thus be seen that there is herein described, apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In a machine of the class described, a magazine for articles to be delivered, an article receiving device having a plurality of rows of receivers, means for moving a row of receivers into registry with the delivery mechanism of the magazine, means for delivering articles from the magazine and spring urged, mechanically checked means synchronized with said delivery apparatus for advancing the receiver step by step to bring new rows of receivers into receiving position.

2. In a machine of the class described, a bed plate, a carriage movable step by step over the bed plate, a splint magazine disposed above the bed plate, splint ejecting mechanism actuated in synchronism with the movement of the carriage, means for delivering a splint receiving device on to the carriage and means for ejecting the receiving device after it has been moved by the carriage past splint receiving position.

3. In a machine of the class described, a bed plate, a carriage movable step by step over the bed plate and a splint receiving mechanism to be mechanically interlocked with and actuated by the carriage, a splint magazine arranged above the bed plate and splint ejecting mechanism operating in synchronism with the movement of the carriage, said means arranged to effect carriage movement during the idle stroke of the splint ejecting mechanism and to restrain movement of the carriage during the working stroke of the splint ejecting mechanism.

4. In a machine of the class described, a bed plate and a carriage movable thereover, a splint magazine arranged above the bed plate and under which the carriage travels, means normally latching the carriage against movement under the splint magazine, trip mechanism associated with said latching means arranged in the path of and actuated by the movement of a splint receiving device into operative relation with the carriage.

5. In a machine of the class described, a bed plate and a carriage movable thereover, a splint magazine arranged above the bed plate and under which the carriage travels, means normally latching the carriage against movement under the splint magazine, trip mechanism associated with said latching means actuated by the movement of a splint receiving device into operative relation with the carriage, and means tending to move the carriage under the splint magazine when said latch is released.

6. In a machine of the class described, a bed plate and a carriage movable thereover, a splint magazine arranged above the bed plate and under which the carriage travels, means normally latching the carriage against movement under the splint magazine, trip mechanism associated with said latching means actuated by the movement of a splint receiving device into operative relation with the carriage, means tending to move the carriage under the splint magazine when said latch is released, and means for permitting advance of the carriage step by step under the magazine after said latch has been released.

7. In a machine of the class described, a bed plate and a carriage movable thereover, a splint magazine arranged above the bed plate and under which the carriage travels, means normally latching the carriage against movement under the splint magazine, trip mechanism associated with said latching means and adapted to be actuated by the movement of a splint receiving device into operative relation with the carriage, means tending to move the carriage under the splint magazine when said latch is released, manually controlled means for permitting advance of the carriage step by step under the magazine after said latch has been released and vertically movable splint ejecting devices for displacing splints for said magazine, downwardly toward the bed plate.

8. In a machine of the class described, a bed plate and a carriage movable thereover, a splint magazine arranged above the bed plate and under which the carriage travels, means normally latching the carriage against movement under the splint magazine, trip mechanism associated with said latching means and adapted to be actuated by the movement of a splint receiving device into operative relation with the carriage, means tending to move the carriage under the splint magazine when said latch is released, manually controlled means for permitting advance of the carriage step by step under the magazine after said latch has been released and vertically movable splint ejecting devices for displacing splints for said magazine, downwardly toward the bed plate, and means controlled by said movable carriage feeding means for actuating the splint ejectors.

9. In a machine of the class described, a splint magazine and splint ejector mechanism associated therewith, a carriage adapted to support a splint receiving mechanism and spring actuated, mechanically checked operating means for moving the carriage step by step in timed relationship with the splint ejector mechanism.

10. In a machine of the class described, a splint magazine and splint ejector mechanism associated therewith, a spring urged carriage normally latched against spring impelled movement adapted to support a splint receiving mechanism and operating means for moving the carriage after latching thereof step by step in timed relationship with the splint ejector mechanism, the operating means being constructed and arranged to move the carriage on the idle stroke of the splint ejectors and to hold the carriage against movement during the working stroke of the splint ejectors.

11. In a machine of the class described, a bed plate and a spring impelled slide carriage movable thereover, a platform above the bed plate adapted to support and guide a device to be actuated by the carriage, said carriage including parts projecting through the platform to engage said device and depressible below the platform to release said device.

12. In a machine of the class described, a bed plate and a carriage movable thereover, a platform above the bed plate adapted to support and guide a device to be actuated by the carriage, said carriage including parts projecting through the platform to engage said device, means normally latching the carriage against movement and means engageable by the device to be actuated for releasing said latch, as said device arrives upon the platform.

13. In a machine of the class described, a bed plate and a carriage movable thereover, a platform above the bed plate adapted to support and guide a device to be actuated by the carriage, said carriage including parts projecting through the platform to engage said device, means normally latching the carriage against movement and means engageable by the device to be actuated for releasing said latch, as said device arrives upon the platform, and a gravity chute down which the device to be actuated is conveyed to the platform.

14. In a machine of the class described, a bed plate and a carriage movable thereover, a receiving device adapted to be actuated by the carriage, an article discharging mechanism arranged above the path of travel of the receiving device and means for discharging articles into said receiving device in its course of carriage actuated travel, means disposed above the bed plate and supporting the receiving device during its carriage actuated movement, a pair of rails constituting a continuation of said supporting means and means for passing the receiving device on to said rails after it has passed under the article discharging mechanism, said last mentioned rails being normally latched against displacement and displaceable by the weight of said receiving device when said latch is released, whereby the receiver is self-ejecting by gravity.

15. In a machine of the class described, a bed plate and a carriage movable thereover, a receiving device adapted to be actuated by the carriage, an article discharging mechanism arranged above the path of travel of the receiving device and means for discharging articles into said receiving device in its course of carriage actuated travel, means disposed above the bed plate and supporting the receiving device during its carriage actuated movement, a pair of rails constituting a continuation of said supporting means and means for passing the receiving device on to said rails after it has passed under the article discharging mechanism, said last mentioned rails being normally latched against displacement and displaceable by the weight of said receiving device when said latch is released, whereby the receiver is self-ejecting by gravity, and a gravity discharge chute into which the receiving device drops when it has displaced the rails.

16. In a machine of the class described, a bed plate and a carriage movable thereover, a receiving device adapted to be actuated by the carriage, an article discharging mechanism arranged above the path of travel of the receiving device and means for discharging articles into said receiving device in its course of carriage actuated travel, means disposed above the bed plate and supporting the receiving device during its carriage actuated movement, a pair of rails constituting a continuation of said supporting means and means for passing the receiving device on to said rails after it has passed under the article discharging mechanism, said last mentioned rails being normally latched against displacement and displaceable by the weight of said receving device when said latch is released, whereby the receiver is self-ejecting by gravity, said latch mechanism being actuated by the receiving device as it is moved on to the displaceable rails.

17. In a machine of the class described, a bed plate and a carriage movable thereover, a receiving device adapted to be actuated by the carriage, an article discharging mechanism arranged above the path of travel of the receiving device and means for discharging articles into said receiving device in its course of carriage actuated travel, means disposed above the bed plate and supporting the receiving device during its carriage actuated movement, a pair of rails constituting a continuation of said supporting means and means for passing the receiving device on to said rails after it has passed under the article discharging mechanism, said last mentioned rails being normally latched against displacement and displaceable by the weight of said receiving device when said latch is released, whereby the receiver is self-ejecting by gravity, and a gravity discharge chute into which the receiving device drops when it has displaced the rails, said latch mechanism being actuated by the receiving device as it is moved on to the displaceable rails, and means for automatically restoring the rails and relatching them after the receiving device has displaced them and been ejected.

18. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage.

19. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said reeciving device, means for discharging articles in timed relation to the movement of the carriage, and clamping means associated with the receiver for clamping said articles in position.

20. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position and means to actuate said clamping means after the receiver has been filled.

21. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position and means to actuate said clamping means after the receiver has been filled, and means to engage the filled receiving device and to carry it to a position for ejection from the machine.

22. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position and means to actuate said clamping means after the receiver has been filled, and means to engage the filled receiving device and to carry it to a position for ejection from the machine, said means being operated in synchronism with the clamp operating mechanism.

23. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position and means to actuate said clamping means after the receiver has been filled, and means to engage the filled receiving device and to carry it to a position for ejection from the machine, said means being operated in synchronism with the clamp operating mechanism, normally latched displaceable support bars on to which the carriage is moved into position for ejection.

24. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position and means to actuate said clamping means after the receiver has been filled, and means to engage the filled receiving device and to carry it to a position for ejection from the machine, said means being operated in synchronism with the clamp operating mechanism, normally latched displaceable support bars on to which the carriage is moved into position for ejection, and a latch tripping mechanism to release said bars.

25. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position, means to actuate said clamping means after the receiver has been filled, means to engage the filled receiving device and to carry it to a position for ejection from the machine, said means being operated in synchronism with the clamp operating mechanism, normally latched displaceable support bars on to which the carriage is moved into position for ejection, and a latch tripping mechanism to release said bars, actuated by the carriage itself.

26. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, clamping means associated with the receiver for clamping said articles in position, means to actuate said clamping means after the receiver has been filled, means to engage the filled receiving device and to carry it to a position for ejection from the machine, said means being operated in synchronism with the clamp operating mechanism, normally latched displaceable support bars on to which the carriage is moved into position for ejection, and a latch tripping mechanism to release said bars, actuated by the carriage itself, a gravity discharge chute arranged under the bars and into which the receiver falls.

27. In a machine of the class described, a bed plate, an article discharging mechanism arranged above the bed plate, a support means above the bed plate along which the article receiver is adapted to be carried, means for delivering a receiver on to said support means, means for moving the receiver step by step under the article discharging means and for operating said article discharging means in synchronism with the movement of the receiver, means for moving the receiver to ejecting position and means controlled by such movement for permitting gravity ejection of the filled receiver.

28. In a machine of the class described, a bed plate, an article discharging mechanism arranged above the bed plate, a support means above the bed plate along which the article receiver is adapted to be carried, means for delivering a receiver on to said support means, means for moving the receiver step by step under the article discharging means and for operating said article discharging means in synchronism with the movement of the receiver, means for moving the receiver to ejecting position and means controlled by such movement for permitting gravity ejection of the filled receiver, and a gravity chute down which the ejected receiver is carried.

29. In a machine of the class described, a bed plate, an article discharging mechanism arranged above the bed plate, a support means above the bed plate along which the article receiver is adapted to be carried, means for delivering a receiver on to said support means, means for moving the receiver step by step under the article discharging means and for operating said article discharging means in synchronism with the movement of the receiver, means for moving the receiver to ejecting position and means controlled by such movement for permitting gravity ejection of the filled receiver, a manually operated control shaft, means controlled thereby for shifting the receiver one step on the idle stroke of the discharge mechanism and for retaining the receiver against movement during the working stroke of the discharging mechanism.

30. In a machine of the class described, a bed plate and a carriage movable thereover, a receiving device adapted to be actuated by the carriage, an article discharging mechanism arranged above the path of travel of the receiving device and means for discharging articles into said receiving device in its course of carriage actuated travel, means disposed above the bed plate and supporting the receiving device during its carriage actuated movement, a pair of rails constituting a continuation of said supporting means and means for passing the receiving device on to said rails after it has passed under the article discharging mechanism, said last mentioned rails being normally latched against displacement and displaceable by the weight of said receiving device when said latch is released, whereby the receiver is self-ejecting by gravity, restoring springs for the displaceable rails and a restoring spring for the rail latching means.

31. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, stop mechanism working through the bed plate of the machine and controlling the step by step movement of the carriage.

32. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means above the bed plate for supporting said receiving device, means for discharging articles in timed relation to the movement of the carriage, means to release the carriage from engagement with the receiver after the latter has been filled and means checking the receiver after it is released by the carriage.

33. In a machine of the class described, a bed plate, a normally latched carriage movable step by step over the bed plate, when said latch is released, an article discharging mechanism arranged above the bed plate, an article receiving device adapted to be engaged by said carriage and moved step by step under the article discharging means, means for discharging articles in timed relation to the movement of the carriage, means to release the carriage from engagement with the receiver after the latter has been filled and means checking the receiver after it is released by the carriage, means for displacing said checking means and for drawing the receiver to a position where it may be discharged from the machine.

34. In a machine of the class described, an article magazine, a carriage to travel under the magazine, means normally latching the carriage against movement, means for delivering an article receiving device at the machine, comprising a gravity chute, a trip mechanism for releasing the carriage latch engageable by the receiver, as the latter enters the machine under its own momentum.

35. In a machine of the class described, a bed plate and a carriage movable thereon, a platform arranged above the bed plate, a device adapted to be delivered upon the platform and to be moved thereover by the carriage, the platform being slotted to accommodate for movement of the carriage elements which engage said device, the carriage including downwardly displaceable parts to be retracted below the slots, whereby to permit movement of said device laterally onto the platform over the carriage.

36. In a machine of the class described, a bed plate and a carriage movable thereon, a platform arranged above the bed plate, a device adapted to be delivered upon the platform and to be moved thereover by the carriage, the platform being slotted to accommodate for movement of the carriage elements which engage said device, the carriage including downwardly displaceable parts to be retracted below the slots, whereby to permit movement of said device laterally onto the platform over the carriage, means for normally latching the carriage in retracted position, and for maintaining said carriage parts depressed.

37. In a machine of the class described, a bed plate and a carriage movable thereon, a platform arranged above the bed plate, a device adapted to be delivered upon the platform and to be moved thereover by the carriage, the platform being slotted to accommodate for movement of the carriage elements which engage said device, the carriage including downwardly displaceable parts to be retracted below the slots, whereby to permit movement of said device laterally onto the platform over the carriage, means for normally latching the carriage in retracted position and for maintaining said carriage parts depressed, and means controlled by the device to be moved over the platform for releasing said latching means as it arrives on the platform.

38. In a machine of the class described, a bed plate and a carriage movable thereon, a platform arranged above the bed plate, a device adapted to be delivered upon the platform and to be moved thereover by the carriage, the platform being slotted to accommodate for movement of the carriage elements which engage said device, the carriage including downwardly displaceable parts to be retracted below the slots, whereby to permit movement of said device laterally onto the platform over the carriage, means for normally latching the carriage in retracted position, and for maintaining said carriage parts depressed, means controlled by the device to be moved over the platform for releasing said latching means as it arrives on the platform, and means whereby as said latching means is released, the displaceable carriage parts are moved upwardly to engage the device.

39. In a machine of the class described, a bed plate and a carriage movable thereon, a platform arranged above the bed plate, a device adapted to be delivered upon the platform and to be moved thereover by the carriage, the platform being slotted to accommodate for movement of the carriage elements which engage said device, the carriage including downwardly displaceable parts to be retracted below the slots, whereby to permit movement of said device laterally onto the platform over the carriage, means for normally latching the carriage in retracted position and for maintaining said carriage parts depressed, means controlled by the device to be moved over the platform for releasing said latching means as it arrives on the platform, means whereby as said latching means is released, the displaceable carriage parts are moved upwardly to engage the device, and means for again depressing said parts after the carriage has moved the device for a predetermined distance across the platform, whereby to render the device free for further movement under the influence of a secondary actuating mechanism.

40. In a machine of the class described, a bed plate, a carriage movable thereover, a table arranged above the bed plate and adapted to support an article receiver to be actuated by the carriage, an article magazine arranged above the table, means for ejecting articles from said magazine into the receiver as it passes under the magazine, means for actuating the carriage step by step to thereby advance the receiver one step at a time under the magazine, the step by step mechanism including a spring normally urging the carriage in one direction and a pair of stops working through the bed plate and alternately engageable with the carriage to block movement thereof under the influence of the spring.

41. In a machine of the class described, a bed plate, a carriage movable thereover, a table arranged above the bed plate and adapted to support an article receiver to be actuated by the carriage, an article magazine arranged above the table, means for ejecting articles from said magazine into the receiver as it passes under the magazine, means for actuating the carriage step by step to thereby advance the receiver one step at a time under the magazine, the step by step mechanism including a spring normally urging the carriage in one direction and a pair of stops working through the bed plate and alternately engageable with the carriage to block movement thereof under the influence of the spring, and means synchronizing the movement of the stops and the movement of the article ejectors, whereby the receiver is held stationary on the working stroke of the ejectors and permitted to advance one step upon the idle stroke of the ejectors.

42. Apparatus for use in the manufacture of handled articles, including a container for the articles and a carrier for the handles, and means properly collocating the handle carrier with the article container, said means including a track over which the article container is movable and means to block movement of said container beyond a predetermined position on the track, a second inclined track arranged above the first one and down which the handle carrier is adapted to descend by gravity, said blocker mechanism being displaceable by the handle carrier and the article holder being disposed in the path of movement of the handle carrier whereby it is moved under the momentum of the latter beyond the blocker mechanism, the converging tracks being effective to properly collocate the handles with the articles as the article holder is engaged and advanced by the handle carrier.

43. Mechanism as set forth in claim 42 and wherein the blocker mechanism is self-restoring to blocking position after the handle carrier has passed beyond it.

44. In a machine of the class described, a splint magazine and a gauging table thereunder, support means for the splint receiver arranged above the gauging table and below the magazine, means to move the splint receiver along its support, means to deposit splints therein with their ends pendent below the receiver to an extent predetermined by the gauging table, means for clamping the splints in the receiver, an inclined trough and means for dropping the filled receiver into the trough upon the aligned lower ends of the splints.

45. In a machine of the class described, an ejector mechanism including an inclined trough, a pair of rails arranged above the trough and on to which a splint filled receiving device is adapted to be moved, said receiving device being of the character in which a plurality of splints of equal length are clamped therein, means normally supporting the rails against displacement and means actuated by movement of the receiver under the rails for rendering the support means inoperative, whereby the weight of the receiver displaces the rails and the receiver drops upon the ends of the splints into the trough.

46. In a machine of the class described, an ejector mechanism including an inclined trough, a pair of rails arranged above the trough and on to which a splint filled receiving device is adapted to be moved, said receiving device being of the character in which a plurality of splints of equal length are clamped therein, means normally supporting the rails against displacement and means actuated by movement of the receiver under the rails for rendering the support means inoperative, whereby the weight of the receiver displaces the rails and the receiver drops upon the ends of the splints into the trough, and means for automatically restoring the displaceable rails and for automatically restoring the rail supporting means after gravity ejection of the receiver.

47. In a machine of the class described, a stick magazine and a table thereunder, a stick receiver having rows of stick holders, means to move the receiver step by step over the table and to fill it one row at a time with sticks, an ejector means movable into engagement with the receiver and means acting simultaneously with such movement of the ejector means for clamping the sticks in the holder.

48. A splint magazine including a pair of spaced parallel splint receiving channels in which a row of flat elongated splints are adapted to be arranged back to back, an abutment plate at the forward end of the channels, pusher means comprising a transverse pin spanning and sliding in the channels and pivoted followers on the ends of the pusher pin engaging the rearmost sticks of each row, a counterweight operatively connected to the cross pin, and acting through the pushers to urge the rows of sticks against the front abutment plate and means movable at right angles to the direction of movement of the rows of sticks for carrying the foremost stick of each row to ejected position.

49. In an apparatus of the class described, a table and a splint magazine arranged thereabove, a gravity chute down which a stick receiving device is adapted to descend upon the table, means to move the stick receiving device over the table and to fill the same with sticks from the magazine, a trough behind the table into which the filled stick receiver is adapted to drop and a gravity conveyor from said trough down which the stick receiver is adapted to travel.

50. Apparatus as described in claim 49 wherein means is provided for clamping the sticks in the receiver after the latter has been completely filled and before the receiver is ejected.

51. Apparatus as set forth in claim 49 and wherein support means normally preventing movement of the receiver into the trough is adapted to be released by movement of the receiver into position above the trough.

52. In an apparatus of the class described, a table and a splint magazine arranged thereabove, a gravity chute down which a stick receiving device is adapted to descend upon the table, means to move the stick receiving device over the table and to fill the same with sticks from the magazine, a trough behind the table into which the filled stick receiver is adapted to drop and a gravity conveyor from said trough down which the stick receiver is adapted to travel, a carriage movable step by step for conveying the receiver under the stick magazine and an ejecting mechanism for shifting the filled carriage into position over the trough.

53. In an apparatus of the class described, a table and a splint magazine arranged thereabove, a gravity chute down which a stick receiving device is adapted to descend upon the table, means to move the stick receiving device over the table and to fill the same with sticks from the magazine, a trough behind the table into which the filled stick receiver is adapted to drop and a gravity conveyor from said trough down which the stick receiver is adapted to travel, a displaceable support mechanism arranged over the trough, means for moving the stick receiver onto said support mechanism, and means controlled by such movement of the stick receiver for releasing the support mechanism, to permit the receiver to fall.

54. In a machine of the class described, a stationary platform and a stick magazine arranged thereabove, a normally inoperative spring urged carriage arranged under the platform and including parts working through slots in the platform, means for releasing the carriage upon the arrival of a stick receiver on the platform and for causing a movable part of the carriage to spring into operative position above the platform, means for advancing the carriage step by step under the magazine until the stick receiver has been filled, means for thereupon disengaging the carriage from the stick receiver, means to thereupon clamp the sticks in the receiver, a gravity discharge chute, means to move the receiver into supporting position above the chute and means actuated by such movement to render the support means inoperative and to permit the receiver to drop into the chute.

55. The combination with a bed plate and a spring urged carriage associated therewith, of stop mechanism for imparting a step by step movement to the carriage, said stop mechanism including a pair of stops working through the bed plate, one in advance of the other, a common carrier member for the stops, a spring acting to elevate the carrier member and hold one stop in carriage blocking position and the other stop above carriage blocking position, means to depress said carrier and thereby withdraw the first mentioned stop from blocking position and move the second mentioned stop into blocking position, said means including a tilting lever engageable with the stop carrier to depress the latter as the lever is tilted in one direction.

56. The combination with a bed plate and a spring urged carriage associated therewith, of stop mechanism for imparting a step by step movement to the carriage, said stop mechanism including a pair of stops working through the bed plate, one in advance of the other, a common carrier member for the stops, a spring acting to elevate the carrier member and hold one stop in carriage blocking position and the other stop above carriage blocking position, lever means to depress said carrier and thereby withdraw the first mentioned stop from blocking position and move the second mentioned stop into blocking position, and means for tilting the lever including a rockable shaft and a finger on the shaft engageable with the free end of the lever during a portion of the rocking movement of the shaft.

57. In a machine of the class described, a bed plate and a carriage slidable thereon, a slotted table above the bed plate upon which the device to be actuated by the carriage is supported, the carriage including a relatively fixed portion projecting above the table to engage said device and a relatively movable portion, spring-urged above the table to engage said device and means operable at each end of the carriage stroke for depressing said relatively movable means.

58. In a machine of the class described, a bed plate and a carriage slidable thereon, a slotted table above the bed plate upon which the device to be actuated by the carriage is supported, the carriage including a relatively fixed portion projecting above the table to engage said device and a relatively movable portion, spring-urged above the table to engage said device and means operable at each end of the carriage stroke for depressing said relatively movable means, the movable means including levers having upturned ends to engage the device to be moved by the carriage, springs urging the levers upwardly and cam means to depress the levers against the action of the springs at the ends of the carriage stroke.

59. An apparatus as set forth in the preceding claim wherein the levers are provided with tail pieces engageable with the operating cams.

60. In a machine of the class described, a stick magazine and a table thereunder, means to move an article receiver over the table under the magazine and to fill it with articles, an ejector mechanism normally spring held in inoperative position, a handle member for moving the ejector into engagement with the receiver against the action of the spring, said spring being operable when the lever is released to effect ejection of the receiver.

61. In a machine of the class described, a stick magazine and a table thereunder, means to move an article receiver over the table under the magazine and to fill it with articles, an ejector mechanism normally spring held in inoperative position, a handle member for moving the ejector into engagement with the receiver against the action of the spring, said spring being operable when the lever is released to effect ejection of the receiver, said ejector mechanism including means to limit the advance of the filled receiver prior to the engagement thereof by the ejector.

62. In a machine of the class described, a stick magazine and a table thereunder, means to move an article receiver over the table under the magazine and to fill it with articles, an ejector mechanism normally spring held in inoperative position, a handle member for moving the ejector into engagement with the receiver against the action of the spring, said spring being operable when the lever is released to effect ejection of the receiver, said ejector mechanism including means to clamp the sticks in the filled receiver as the ejector is engaged with the receiver.

63. In apparatus of the class described, a machine including a frame work, a table supported on the frame member, a splint delivery mechanism supported on the frame work above the table, a gravity discharge chute for delivering an empty stick receiver on the table, a gravity chute into which the receiver is adapted to drop after it has passed over the table and been filled with sticks, a track arranged under the table, and upon which container members for coaction with the sticks are movable, a blocker mechanism normally limiting the movement of such container mechanism, means whereby movement of a filled stick receiver down the last mentioned gravity chute is operable to release said blocker mechanism, engage the container, enter the sticks into properly collocated relationship with the container and advance the container to a position beyond the blocker mechanism.

64. In a machine of the class described, a table and a stick dispensing mechanism arranged above the table, a control shaft disposed under the table, a cross head, and ejectors carried thereby for ejecting sticks from said mechanism, means for advancing a stick receiver across the table in timed relationship with the movement of the ejectors, means operated by the shaft for controlling the step by step mechanism and means operable by the shaft for reciprocating the cross head.

65. In a machine of the class described, a table and a stick dispensing mechanism arranged above the table, a control shaft disposed under the table, a cross head, and ejectors carried thereby for ejecting sticks from said mechanism, means for advancing a stick receiver across the table in timed relationship with the movement of the ejectors, means operated by the shaft for controlling the step by step mechanism and means operable by the shaft for reciprocating the cross head, the cross head operating mechanism and the step by step mechanism being so correlated with the receiver as to advance the receiver on the idle stroke of the cross head and hold it stationary on the working stroke thereof.

66. Apparatus as described in claim 64 and wherein hollow standards support the stick magazine and slide rods carrying the cross head work through the standards.

67. Apparatus as described in claim 65 wherein the shaft is provided with an operating handle having limited movement and adapted to depress the cross head as it is moved in one direction and elevate the cross head and advance the receiver as it is moved in the other direction.

68. In a machine of the class described, an article magazine and an article receiver therebelow, a carriage normally latched in inoperative position for moving the receiver under the magazine means for unlatching the carriage and means for advancing it step by step under the magazine.

69. In a machine of the class described, an article magazine and an article receiver, a normally latched carriage for moving the receiver under the magazine and means actuated by emplacement of the receiver on the carriage for unlatching the latch.

70. A method of positioning and centering a plurality of handle members for coaction with a plurality of devices to be assembled upon the handles, which consists in placing a group of handles simultaneously in a handle receiving device and clamping them therein with their ends pendant therebelow, then moving the receiving device in a laterally and downwardly direction to engage said sticks in the article carrying cavities of a horizontal carrier member for the devices to be assembled on the handles.

71. A method as set forth in claim 70 and wherein the article receiver is caused to move step by step as successive groups of handle members are deposited therein and all of the groups of the handle members are simultaneously gripped prior to the movement of the receiver into coaction with the body carrying device.

72. A method as set forth in claim 70 and wherein the receiver device engages with the article carrying device to properly register the sticks with the article as an incident of such movement.

73. In a machine of the class described, means for moving a stick receiver step by step across a table and a stick magazine including means for ejecting sticks in timed relationship to the movement of the receiver the moving means including a spring impelled carriage and intermittently operated mechanical blockers to temporarily check said spring impelled movement during ejection of the sticks.

74. In a machine of the class described, apparatus for filling a stick receiver, a gravity chute for delivering an empty receiver to such apparatus and a gravity chute for carrying a filled receiver from such apparatus.

75. In a machine of the class described, apparatus for filling a stick receiver, a gravity chute for delivering an empty receiver to such apparatus and a gravity chute for carrying a filled receiver from such apparatus, the apparatus including means actuated by the empty stick receiver upon its arrival for partially controlling the movement of the receiver through the apparatus.

76. In a machine of the class described, apparatus for filling a stick receiver, a gravity chute for delivering an empty receiver to such apparatus and a gravity chute for carrying a filled receiver from such apparatus, the apparatus including means controlled by movement of the filled stick receiver to permit the movement thereof on to the last mentioned chute.

77. In a machine of the class described, apparatus for filling a stick receiver, a gravity chute for delivering an empty receiver to such apparatus and a gravity chute for carrying a filled receiver from such apparatus, the apparatus including movement controlling means for the receiver actuated by the receiver as it arrives at the apparatus.

78. In a machine of the class described, apparatus for filling an article receiver, means to convey a receiver by gravity to such apparatus and means set in motion by the momentum of the receiver for initiating movement of such apparatus.

79. In a machine of the class described, apparatus for filling an article receiver, means to convey a receiver by gravity to such apparatus and means set in motion by the momentum of the receiver for initiating movement of such apparatus, a second gravity conveyor upon which the filled receiver is emplaced for discharge from the machine.

80. In a machine of the class described, apparatus for filling an article receiver, means to convey a receiver by gravity to such apparatus and means set in motion by the momentum of the receiver for initiating movement of such apparatus, a second gravity conveyor upon which the filled receiver is emplaced for discharge from the machine, and means released by the receiver for permitting the deposit of the receiver on said second mentioned conveyor.

81. The combination with a stick dispensing machine of gravity chutes for delivering empty stick receivers thereto and conveying filled stick receivers therefrom, the receivers including handle devices and rollers on the handles engageable with the rails of the gravity chutes.

82. In a machine of the class described, means for moving an article receiving device under an article dispensing device step by step and means for ejecting the filled receiver, a pair of manually controlled operating levers arranged at opposite sides of the machine and respectively controlling the movement of the receiver under the dispenser and the ejection of the receiver.

83. In a machine of the class described, a magazine for splints, a splint receiving device having a plurality of receivers, mechanism for delivering splints from the magazine to the receivers, means constantly tending to advance the receiving device to bring successive receivers into splint receiving position, and mechanically checked means synchronized with the delivery means for releasing the receiving device for step by step movement by the first mentioned means.

84. In a machine of the class described, a carriage movable step by step, a splint magazine associated with the carriage, splint ejecting mechanism actuated in synchronism with the movement of the carriage, means for delivering a splint receiving device onto the carriage, and means for ejecting the receiving device after it has been moved by the carriage past splint receiving position.

85. In a machine of the class described, a carriage, a splint magazine associated with the carriage, means normally latching the carriage against movement when in splint receiving relation with the magazine, and trip mechanism associated with said latching means arranged in the path of and actuated by the movement of a splint receiving device into operative relation with the carriage.

86. In a machine of the class described, a carriage adapted to support a device, a platform associated with the carriage for receiving the device from the carriage, means normally latching the platform in position for supporting the device, and means actuated when the device is supported by the platform for releasing said latch.

87. In a machine of the class described, a splint magazine, a carriage for a splint receiver associated with the magazine, means for delivering the receiver to the carriage, means operated by the delivery of the receiver to the carriage for clamping the receiver in proper position on the carriage, a splint ejector associated with the carriage, and means synchronizing the movement of the ejector and carriage whereby the ejector is actuated only when the receiver is in splint receiving position.

88. In a machine of the class described, a track for a splint receiver, a track for a mold having a cavity for receiving the splint carried by the receiver, a splint magazine, and means for delivering a splint from the magazine to the receiver and for causing the receiver with the splint therein to be moved into splint receiving position of the splint and cavity of the mold on the mold track.

MILTON SCHNAIER.